(12) United States Patent
Nakayama et al.

(10) Patent No.: US 12,473,473 B2
(45) Date of Patent: Nov. 18, 2025

(54) SILICONE RELEASE AGENT COMPOSITION AND A RELEASE PAPER OR FILM

(71) Applicant: Shin-Etsu Chemical Co., Ltd., Tokyo (JP)

(72) Inventors: Ken Nakayama, Annaka (JP); Yasuyoshi Kuroda, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1156 days.

(21) Appl. No.: 17/417,626

(22) PCT Filed: Dec. 19, 2019

(86) PCT No.: PCT/JP2019/049941
§ 371 (c)(1),
(2) Date: Jun. 23, 2021

(87) PCT Pub. No.: WO2020/137835
PCT Pub. Date: Jul. 2, 2020

(65) Prior Publication Data
US 2022/0049141 A1 Feb. 17, 2022

(30) Foreign Application Priority Data
Dec. 25, 2018 (JP) .................. 2018-240970

(51) Int. Cl.
| C08G 77/16 | (2006.01) |
| C08G 77/18 | (2006.01) |
| C08G 77/24 | (2006.01) |
| C09J 7/38 | (2018.01) |
| C09J 7/40 | (2018.01) |
| C09J 183/04 | (2006.01) |

(52) U.S. Cl.
CPC ............ *C09J 183/04* (2013.01); *C08G 77/16* (2013.01); *C08G 77/18* (2013.01); *C08G 77/24* (2013.01); *C09J 7/38* (2018.01); *C09J 7/401* (2018.01); *C09J 2400/28* (2013.01); *C09J 2483/005* (2013.01)

(58) Field of Classification Search
CPC ................................ C08L 83/04; C08L 83/08
USPC .................... 528/15, 31, 32, 42, 43
See application file for complete search history.

(56) References Cited

U.S. PATENT DOCUMENTS

| 4,208,504 A * | 6/1980 | Hockemeyer .......... D21H 19/32 |
| | | 528/33 |
| 2005/0038183 A1* | 2/2005 | Ahn ....................... C08L 83/08 |
| | | 524/861 |
| 2011/0251339 A1 | 10/2011 | Yamaguchi et al. |
| 2012/0219794 A1 | 8/2012 | Seth et al. |
| 2013/0224502 A1 | 8/2013 | Nakajima et al. |
| 2015/0225574 A1 | 8/2015 | Kanto et al. |
| 2016/0297999 A1 | 10/2016 | Carvajal et al. |
| 2017/0190939 A1 | 7/2017 | Hori et al. |
| 2018/0086915 A1 | 3/2018 | Tsuchida |

(Continued)

FOREIGN PATENT DOCUMENTS

| EP | 3819343 A1 | 5/2021 |
| JP | S63234061 A | 9/1988 |
| JP | H0718185 U | 3/1995 |

(Continued)

OTHER PUBLICATIONS

English translation of International Search Report corresponding to International Patent Application No. PCT/JP2019/049941 (3 pages) (mailed Mar. 10, 2020).

(Continued)

*Primary Examiner* — Margaret G Moore
(74) *Attorney, Agent, or Firm* — Myers Bigel, P.A.

(57) ABSTRACT

The present invention provides a silicone release agent composition comprising the components (A), (B), (C) and (D): 50 to 99.9 parts by mass of (A) linear or branched organopolysiloxane represented by the general formula (1) and having at least two alkenyl group-containing organic groups and at least one aryl group-containing organic group in one molecule and having no fluorine-containing organic group, wherein a percentage of the number of the alkenyl group-containing organic group is 0.005 to 5% and a percentage of the number of the aryl group-containing organic groups is 0.1 to 40%, each based on the total number of groups each bonded to a silicon atom; 50 to 0.1 part by mass of (B) linear or branched organopolysiloxane having at least one alkenyl group-containing organic group and at least one fluorine-containing organic group in one molecule, wherein a percentage of the number of the fluorine-containing organic group is 3% to 50%, based on the total number of groups each bonded to a silicon atom, provided that the total amount of components (A) and (B) is 100 parts by mass; (C) organohydrogenpolysiloxane having three or more hydrogen atoms each bonded to a silicon atom in one molecule and having no fluorine-containing organic group, in such an amount that a ratio of the number of the SiH group in component (C) to the total number of the alkenyl group in components (A) and (B) is from 0.5 to 15; and a catalytic amount of (D) platinum group metal catalyst, provided that the silicone release agent composition does not comprise (E) organohydrogenpolysiloxane having one or more hydrogen atoms each bonded to a silicon atom and having a fluorine-containing organic group.

19 Claims, No Drawings

(56) References Cited

U.S. PATENT DOCUMENTS

| | | | |
|---|---|---|---|
| 2020/0048508 A1 | 2/2020 | Onozawa et al. | |
| 2022/0025179 A1* | 1/2022 | Kadlec | C08G 77/08 |

FOREIGN PATENT DOCUMENTS

| | | | |
|---|---|---|---|
| JP | 2005060554 | A | 3/2005 |
| JP | 2011219630 | A | 11/2011 |
| JP | 2012196846 | A | 10/2012 |
| JP | 2013510921 | A | 3/2013 |
| JP | 2013170262 | A | 9/2013 |
| JP | 2015147935 | A | 8/2015 |
| JP | 2016023288 | A | 2/2016 |
| JP | 2016182772 | A | 10/2016 |
| JP | 2016183291 | A | 10/2016 |
| JP | 2017505361 | A | 2/2017 |
| JP | 2017165893 | A | 9/2017 |
| JP | 2017206594 | A | 11/2017 |
| TW | 201829622 | A | 8/2018 |
| WO | 2006070947 | A1 | 7/2006 |
| WO | 2014042188 | A1 | 3/2014 |
| WO | 2016006252 | A1 | 1/2016 |
| WO | 2016152369 | A1 | 9/2016 |
| WO | 2016152992 | A1 | 9/2016 |
| WO | 2018066448 | A1 | 4/2018 |
| WO | 2020009007 | A1 | 1/2020 |

OTHER PUBLICATIONS

Machine translation of office action issued for Korean Patent Application No. 10-2021-7020831 (12 pages) (dated Oct. 8, 2024).

* cited by examiner

SILICONE RELEASE AGENT COMPOSITION AND A RELEASE PAPER OR FILM

TECHNICAL FIELD

The present invention relates to a silicone release agent composition comprising a fluorine-containing silicone and a fluorine-lacking silicone, and a release paper or film comprising a cured product of the composition.

BACKGROUND OF THE INVENTION

With the purpose of preventing adhesion or sticking between a substrate, such as paper, plastic film, and synthetic fiber cloth, and a pressure-sensitive adhesive substance, a cured film of a silicone composition is conventionally formed on a surface of the substrate to provide releasability, such is usually called "release paper" or "release film".

Silicone adhesives composed mainly of an organopolysiloxane are used as the aforesaid pressure-sensitive adhesive substance in various applications because they are excellent in heat resistance, cold resistance, weather resistance, chemical resistance, electric insulation and low toxicity. Silicone adhesives also have excellent wettability and adhesion to various adherends such as silicone resins, polyolefins, fluorine resins, silicone elastomers and silicone release sheets to which organic resin-based adhesives such as acrylic or rubber-based adhesives are difficult to adhere.

An adhesive tape having a silicone adhesive is prepared by applying a silicone adhesive to a substrate such as a plastic film and curing it by a crosslinking reaction to improve adhesion properties. Examples of such an adhesive tape include heat-resistant adhesive tapes and heat-resistant masking tapes, wherein the substrate is heat-resistant;

chemical-resistant masking tapes, electrical insulation tapes, and splicing tapes for joining silicone release sheets together.

The silicone adhesives adhere strongly also to a silicone-based release agent of a release paper or film which is often used for protecting an adhesive layer on a product. Therefore, a release agent mainly comprising a fluorine-containing material is used to protect the adhesive surface of an adhesive tape to which a silicone adhesive has been applied.

Patent Literatures 1 to 7 describe that a silicone release agent having a fluorine-containing organic group is cured via hydrosilylation to form a cured film which is excellent in releasability from silicone adhesives.

However, fluorine-containing silicone release agents are more expensive than general fluorinating materials and silicone release agent materials. Methods of adding an organopolysiloxane having no fluorine-containing organic group to a fluorine-containing silicone release agent composition has been used in order to give releasability to the release agent at a lower cost.

Patent Literatures 8 and 9 describe that a composition comprising an ethylenically unsaturated fluoroorganopolysiloxane polymer and a fluoroorganohydrogenpolysiloxane crosslinking agent and further comprising a non-fluorinated organopolysiloxane polymer having an ethylenically unsaturated organic group and a non-fluorinated organohydrogenpolysiloxane crosslinking agent is cured via hydrosilylation to provide releasability from silicone adhesives.

Patent Literature 10 describes that improved releasability is achieved by adding a non-functional fluorosilicone polymer to the silicone release agent comprising a functional non-fluorinated silicone polymer and a functional fluorosilicone polymer.

Patent Literatures 11 to 13 describe that an organopolysiloxane having a specific amount of an alkenyl group but having no fluoroalkyl group is added to a silicone release agent composition which comprises an organopolysiloxane having a fluoroalkyl group and an alkenyl group and an organohydrogenpolysiloxane in order to adjust a release force.

PRIOR LITERATURES

Patent Literatures

Patent Literature 1: Japanese Patent Application Laid-Open No. Hei 7-18185
Patent Literature 2: Japanese Patent Application Laid-Open No. 2005-060554
Patent Literature 3: Japanese Patent Application Laid-Open No. 2011-219630
Patent Literature 4: Japanese Patent Application Laid-Open No. 2012-196846
Patent Literature 5: WO2016/006252
Patent Literature 6: Japanese Patent Application Laid-Open No. 2017-165893
Patent Literature 7: Japanese Patent Application Laid-Open No. 2017-206594
Patent Literature 8: Japanese National Phase Publication No. 2013-510921
Patent Literature 9: Japanese Patent Application Laid-Open No. 2015-147935
Patent Literature 10: Japanese National Phase Publication No. 2017-505361
Patent Literature 11: Japanese Patent Application Laid-Open No. 2016-183291
Patent Literature 12: Japanese Patent Application Laid-Open No. 2016-182772
Patent Literature 13: WO2016/152992

SUMMARY OF THE INVENTION

Problems to be Solved by the Invention

However, the cured film obtained by curing the silicone release agent described in Patent Literatures 8 and 9 is not satisfactory in a release force from the silicone adhesive and in a residual adhesive strength after released. Further, the literatures do not refer to a release force from a hydrosilylation addition curable silicone adhesive layer. In the composition described in Patent Literature 10, the non-functional fluorosilicone polymer bleeds out from the silicone film as a migrated component and, therefore, the release force and the residual adhesive strength are insufficient. Patent Literature 10 does not refer to a release force from a hydrosilylation addition curable adhesive. Patent Literatures 11 to 13 describe that the incorporation of the organopolysiloxane having an alkenyl group but having no fluoroalkyl group results in heavy peeling (i.e., requiring a larger force to peel an adhesive material from the cured coating), and a low release force as attained by a conventional fluorosilicone is not obtained.

As described above, there was not known a release agent for silicone adhesives, which agent contains only a small amount of a fluorine-containing silicone, is less costly, and may form a release coating showing a low release force, when a release coating is peeled from a wide variety of silicone adhesives such as hydrosilylation addition curable or peroxide curable silicone compositions, and further allowing the adhesive composition to have a high residual adhesive strength, after the release coating is peeled off.

The present invention has been made in the aforesaid circumstances. One of the purposes of the present invention is to provide a release agent composition which contains only a small amount of a fluorine-containing silicone, is less costly, and may form a release coating showing a low release force in spite of the small amount of a fluorine-containing silicone, when the release coating is peeled from a silicone adhesive, and further allowing the adhesive composition to have a high residual adhesive strength, after the release coating is peeled off. Another object of the present invention is to provide a release paper or film, having a cured product of the composition.

Means for Solving the Problems

The present inventors conducted keen researches to solve the aforesaid problems and have found that there is provided a release layer which has a very low release force from a silicone adhesive in spite of a reduced amount of a fluorine-containing organopolysiloxane and allows the silicone adhesive to have an excellent residual adhesive strength after the release layer is peeled off, by controlling an amount of an aryl group of an organopolysiloxane comprising an alkenyl group and no fluorine atom in an addition curable silicone composition comprising an organopolysiloxane comprising an alkenyl group and a fluorine atom, an organopolysiloxane comprising an alkenyl group and no fluorine atom and an organohydrogenpolysiloxane comprising no fluorine atom, and lacking an organohydrogenpolysiloxane comprising a fluorine atom.

That is, the present invention provides a silicone release agent composition comprising the following components (A), (B), (C) and (D):

50 to 99.9 parts by mass of (A) linear or branched organopolysiloxane represented by the following general formula (1) and having at least two alkenyl group-containing organic groups and at least one aryl group-containing organic group in one molecule and having no fluorine-containing organic group, wherein a percentage of the number of the alkenyl group-containing organic group is 0.005 to 5% and a percentage of the number of the aryl group-containing organic groups is 0.1 to 40%, each based on the total number of groups each bonded to a silicon atom,

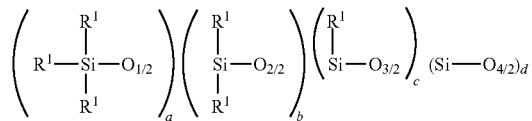

(1)

wherein $R^1$ is, independently of each other, a hydroxyl group or a substituted or unsubstituted, monovalent hydrocarbon group having 1 to 10 carbon atoms and at least two of $R^1$ are an alkenyl group-containing organic group having 2 to 10 carbon atoms and at least one of $R^1$ is an aryl group-containing organic group having 6 to 10 carbon atoms, a is an integer of 2 or more, b is an integer of 1 or more, c is an integer of 0 or more, d is an integer of 0 or more, and $100 \leq a+b+c+d \leq 20,000$;

50 to 0.1 part by mass of (B) linear or branched organopolysiloxane having at least one alkenyl group-containing organic group and at least one fluorine-containing organic group in one molecule, wherein a percentage of the number of the fluorine-containing organic group is 3% to 50%, based on the total number of groups each bonded to a silicon atom, provided that the total amount of components (A) and (B) is 100 parts by mass;

(C) organohydrogenpolysiloxane having three or more hydrogen atoms each bonded to a silicon atom in one molecule and having no fluorine-containing organic group, in such an amount that a ratio of the number of the SiH group in component (C) to the total number of the alkenyl group in components (A) and (B) is from 0.5 to 15; and a catalytic amount of (D) platinum group metal catalyst, provided that the silicone release agent composition does not comprise (E) organohydrogenpolysiloxane having one or more hydrogen atoms each bonded to a silicon atom and having a fluorine-containing organic group.

The present invention further provides a release paper or film having a layer composed of a cured product of the aforesaid silicone release agent composition.

Effects of the Invention

The cured product of the release agent composition of the present invention may be produced at low costs because the amount of the fluorine-containing silicone is small. The release paper or film may be released from a silicone adhesive with a very small release force and, then, the silicone adhesive has a high residual adhesive strength. The release agent composition of the present invention does not contain an organohydrogenpolysiloxane having a fluorine-containing organic group and, which contributes to the small release force and the high residual adhesive strength.

DETAILED DESCRIPTION OF THE INVENTION

The silicone release agent composition of the present invention will be described below in detail.

<Component (A)>

In the present silicone release agent composition, component (A) is a linear or branched organopolysiloxane represented by the following general formula (1) and having at least two alkenyl group-containing organic groups and at least one aryl group-containing organic group in one molecule and having no fluorine-containing organic group, wherein a percentage of the number of the alkenyl group-containing organic group is 0.005 to 5% and a percentage of the number of the aryl group-containing organic groups is 0.1 to 40%, each based on the total number of groups each bonded to a silicon atom. The amount of component (A) is from 50 to 99.9 parts by mass, preferably from 70 to 99.7 parts by mass, more preferably from 90 to 99.5 parts by mass, per 100 parts by mass of component (A) and component (B) which will be described later.

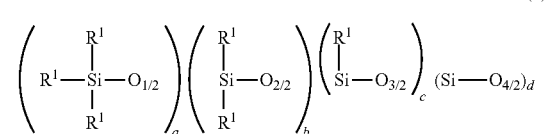

(1)

wherein $R^1$ is, independently of each other, a hydroxyl group or a substituted or unsubstituted, monovalent hydrocarbon group having 1 to 10 carbon atoms and at least two of $R^1$ are an alkenyl group-containing organic group having 2 to 10 carbon atoms and at least one of $R^1$ is an aryl group-containing organic group having 6 to 10 carbon atoms, a is an integer of 2 or more, b is an integer of 1 or more, c is an integer of 0 or more, d is an integer of 0 or more, and $30 \leq a+b+c+d \leq 20,000$.

Component (A) may be alone or a combination thereof.

In the formula (1), $R^1$ is, independently of each other, a hydroxyl group or a substituted or unsubstituted monovalent hydrocarbon group having 1 to 10 carbon atoms and at least 2 of $R^1$ are each an alkenyl group-containing organic group having 2 to 10 carbon atoms. The alkenyl group-containing organic group has 2 to 10 carbon atoms, preferably 2 to 8 carbon atoms and may contain an oxygen atom. Examples thereof include alkenyl groups such as a vinyl, allyl, hexenyl or octenyl group and cycloalkenylalkyl groups such as a cyclohexenylethyl group. Examples of the alkenyl group-containing monovalent hydrocarbon group which contains an oxygen atom include acryloylalkyl groups and methacryloylalkyl groups such as an acryloylpropyl group, an acryloylmethyl group, and a methacryloylpropyl group. The methylene chain may have an ether bond therein, such as $-(CH_2)_2-O-CH_2-CH=CH_2$ and $-(CH_2)_3-O-CH_2-CH=CH_2$.

The amount of the alkenyl group contained in component (A) is such that the percentage of the number of the alkenyl group-containing organic groups is 0.005 to 5%, preferably 0.01 to 4.5%, further preferably 0.05 to 4%, based on the total number of groups each bonded to the silicon atom of the organopolysiloxane, i.e., $R^1$ in the formula (1). If the percentage is less than the aforesaid lower limit, curability may be worse. When the percentage is less than the aforesaid upper limit, the release layer obtained is not too hard so as to have adequate adhesion to and releasability from a substrate. The amount of the alkenyl group is generally determined according to a known method such as an iodination method (such as a Hanus method) or an NMR method, which determination method is applicable in the present invention.

The monovalent hydrocarbon group other than the alkenyl group-containing organic group includes a monovalent hydrocarbon group having 1 to 10 carbon atoms and no aliphatic unsaturated bond. Examples of such include alkyl groups having preferably 1 to 6 carbon atoms such as a methyl, ethyl, propyl or butyl group; cycloalkyl groups preferably having 5 to 8 carbon atoms such as a cyclohexyl group; aryl groups preferably having 6 to 10 carbon atoms such as a phenyl or tolyl group; aralkyl groups preferably having 7 to 10 carbon atoms such as a benzyl group; and those groups in which a part or all of the hydrogen atoms are substituted with a hydroxyl group, a cyano group, a halogen atom other than a fluorine atom, an alkoxysilyl group, a polyoxyalkylene group, an epoxy group or a carboxyl group. Among these, a methyl or phenyl group is preferred.

At least one of $R^1$ is an aryl group-containing organic group. The percentage of the number of the aryl group-containing organic group is from 0.1 to 40%, more preferably from 3 to 35%, more preferably from 5 to 30%, based on the total number of groups each bonded to the silicon atom of the organopolysiloxane, thus $R^1$ in the formula (1). If the amount is more than the aforesaid upper limit, the adhesion of a resulting release layer to a substrate may be worse. If the amount is smaller than the aforesaid lower limit, the intended effect of the aryl group may not be obtained. The aryl group-containing organic group means an aryl group bonded to a silicon atom and an aralkyl group bonded to a silicon atom.

Since component (A) has an aryl group-containing organic group within the aforesaid range of amount, its compatibility with component (B) having a fluorine-containing organic group is reduced, as will be described below. Consequently, component (B) is localized on the surface of the layer of a film obtained by a crosslinking reaction. Once the composition of the present invention comprising the fluorine-containing silicone and the fluorine-lacking silicone is cured, the fluorine-containing silicone is localized on the upper surface of the cured film to decrease a release force from a silicone adhesive.

In the formula (1), a is an integer of 2 or more, preferably an integer of from 2 to 3,000, b is an integer of 1 or more, preferably an integer of from 100 to 14,500, c is an integer of 0 or more, preferably an integer of from 0 to 1,000, d is an integer of 0 or more, preferably an integer of from 0 to 1,000, and $30 \leq a+b+c+d \leq 20,000$, preferably $150 \leq a+b+c+d \leq 15,000$. If the total number of the siloxane units, (a+b+c+d), is smaller than the aforesaid lower limit, reactivity may be worse or uniform application may be difficult. If the total number is more than the aforesaid upper limit, a viscosity of the composition may be too large so that workability in, for example, stirring and mixing may be poor.

Component (A) may be an organopolysiloxane in an oil form or a raw rubber form. The oil one preferably has a viscosity at 25° C. of from 100 to 1,000,000 mPa·s, more preferably from 500 to 800,000 mPa·s. For the raw rubber one, its 30 mass % solution in toluene preferably has a viscosity of from 1,000 to 200,000 mPa·s, more preferably from 3,000 to 100,000 mPa·s. If the viscosity is less than the aforesaid lower limit, curability of the release agent composition may be worse or uniform application may be difficult. If the viscosity is larger than the aforesaid upper limit, the viscosity may be so high as to make stirring difficult in the production of the composition. In the present invention, the viscosity is determined at 25° C. with a rotational viscometer.

Examples of component (A) include, but not limited to, linear or branched organopolysiloxanes represented by the following formulas. Me, Vi, and Ph in the following formulas represent a methyl group, a vinyl group, and a phenyl group, respectively. The bonding order of the siloxane units in the parentheses is not limited to the following ones. In each of the following formulas, the total number of the repeating siloxane units is an average value.

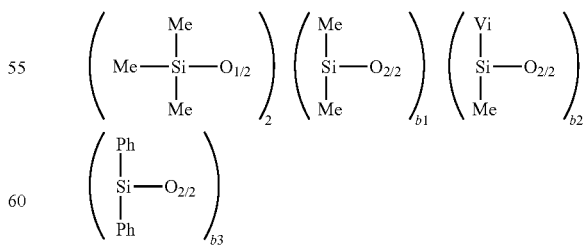

wherein b1, b2 and b3 are the numbers that satisfy the equation, $30 \leq 2+b1+b2+b3 \leq 20,000$ and the percentage of the number of the alkenyl group-containing organic group is from 0.005 to 5% and the percentage of the number of the aryl group-containing organic group is from 0.1% to 40%, each based on the total number of groups each bonded to a silicon atom.

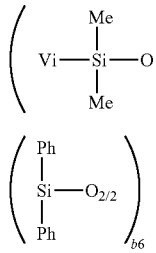

wherein b4, b5 and b6 are the numbers that satisfy the equation, $30 \leq 2+b4+b5+b6 \leq 20{,}000$ and the percentage of the number of the alkenyl group-containing organic group is from 0.005 to 5% and the percentage of the number of the aryl group-containing organic group is from 0.1% to 40%, each based on the total number of groups each bonded to a silicon atom.

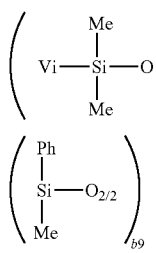

wherein b7, b8 and b9 are the numbers that satisfy the equation, $30 \leq 2+b7+b8+b9 \leq 20{,}000$ and the percentage of the number of the alkenyl group-containing organic group is from 0.005 to 5% and the percentage of the number of the aryl group-containing organic group is from 0.1% to 40%, each based on the total number of groups each bonded to a silicon atom.

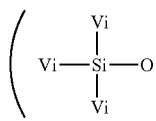

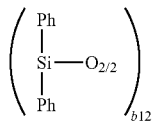

wherein b10, b11 and b12 are the numbers that satisfy the equation, $30 \leq 2+b10+b11+b12 \leq 20{,}000$ and the percentage of the number of the alkenyl group-containing organic group is from 0.005 to 5% and the percentage of the number of the aryl group-containing organic group is from 0.1% to 40%, each based on the total number of groups each bonded to a silicon atom.

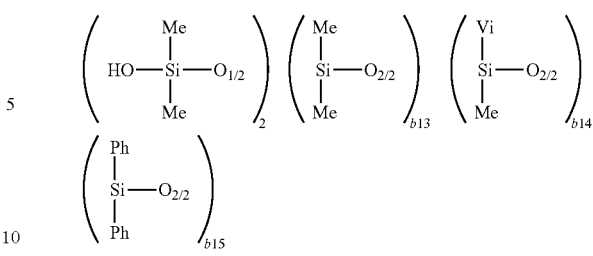

wherein b13, b14 and b15 are the numbers that satisfy the equation, $30 \leq 2+b13+b14+b15 \leq 20{,}000$ and the percentage of the number of the alkenyl group-containing organic group is from 0.005 to 5% and the percentage of the number of the aryl group-containing organic group is from 0.1% to 40%, each based on the total number of groups each bonded to a silicon atom.

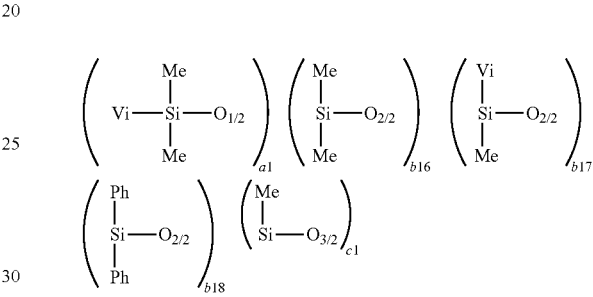

wherein a1, b16, b17, b18 and c1 are the numbers that satisfy the equation, $30 \leq a1+b16+b17+b18+c1 \leq 20{,}000$ and the percentage of the number of the alkenyl group-containing organic group is from 0.005 to 5% and the percentage of the number of the aryl group-containing organic group is from 0.1% to 40%, each of the number of groups bonded to a silicon atom.

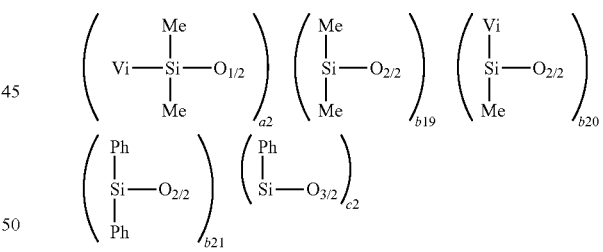

wherein a2, b19, b20, b21 and c2 are the numbers that satisfy the equation, $30 \leq a2+b19+b20+b21+c2 \leq 20{,}000$ and the percentage of the number of the alkenyl group-containing organic group is from 0.005 to 5% and the percentage of the number of the aryl group-containing organic group is from 0.1% to 40%, each based on the total number of groups each bonded to a silicon atom.

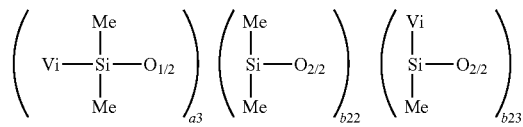

-continued

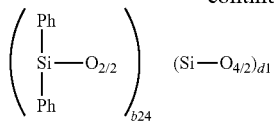

wherein a3, b22, b23, b24 and d1 are the numbers that satisfy 30≤a3+b22+b23+b24+d1≤20,000 and such that the percentage of the number of the alkenyl group-containing organic groups is from 0.005 to 5% and the percentage of the number of the aryl group-containing organic groups is from 0.1% to 40%, each based on the total number of groups each bonded to a silicon atom.

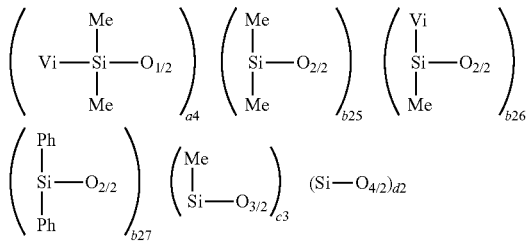

wherein a4, b25, b26, b27, c3 and d2 are the numbers that satisfy the equation, 30≤a4+b25+b26+b27+c3+d2≤20,000 and the percentage of the number of the alkenyl group-containing organic group is from 0.005 to 5% and the percentage of the number of the aryl group-containing organic group is from 0.1% to 40%, each based on the total number of groups each bonded to a silicon atom.

The composition of the present invention optionally may contain a linear or branched organopolysiloxane (A') which has at least two alkenyl group-containing organic groups in one molecule and has neither an aryl group-containing organic group nor a fluorine-containing organic group.

The amount of the organopolysiloxane (A') is not particularly limited as far as it does not detract the characteristics of the present invention and may be such that the percentage of the number of the aryl group-containing organic group in component (A) is preferably 0.1 to 40%, more preferably 3 to 35%, further preferably 5 to 30%, based on the total number of the groups each bonded to a silicon atom in a mixture of components (A) and (A').

The organopolysiloxane (A') is, for example, a linear or branched organopolysiloxane represented by the following formula (1'):

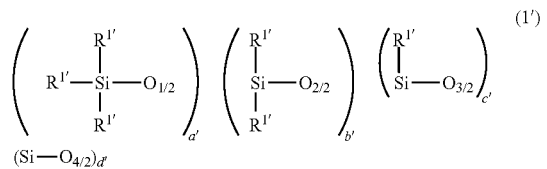

wherein $R^{1'}$ is, independently of each other, a hydroxyl group or a substituted or unsubstituted, monovalent hydrocarbon group having 1 to 10 carbon atoms, provided that $R^{1'}$ is not an aryl group-containing organic group and at least two of $R^{1'}$ are an alkenyl group-containing organic group having 2 to 10 carbon atoms, a' is an integer of 2 or more, b' is an integer of 1 or more, c' is an integer of 0 or more, d' is an integer of 0 or more, and 100≤a'+b'+c'+d'≤20,000.

In the formula (1'), $R^1$ is, independently of each other, a hydroxyl group or a substituted or unsubstituted monovalent hydrocarbon group having 1 to 10 carbon atoms and at least two of $R^{1'}$ are an alkenyl group-containing organic group having 2 to 10 carbon atoms. Examples of the alkenyl group-containing organic group include those mentioned aforesaid formula (1).

The amount of the alkenyl group contained in component (A') is such that the percentage of the number of the alkenyl group-containing organic group is preferably 0.005 to 5%, more preferably 0.01 to 4.5%, further preferably 0.05 to 4%, based on the total number of the groups each bonded to the silicon atom of the organopolysiloxane, i.e., $R^{1'}$ in the formula (1'). If the amount is less than the aforesaid lower limit, curability may be worse. When the amount is less than the aforesaid upper limit, the release layer obtained is not too hard and proper adhesion to a substrate and releasability may be achieved.

The monovalent hydrocarbon group other than the alkenyl group-containing organic group is a substituted or unsubstituted monovalent hydrocarbon group having from 1 to 10 carbon atoms and having no aliphatic unsaturated bond, and is not an aryl group-containing organic group. Examples of such include the monovalent hydrocarbon groups mentioned for $R^1$ in the formula (1). Among these, a methyl group, an ethyl group and a propyl group are preferred, and a methyl group is particularly preferred.

In the formula (1'), a' is an integer of 2 or more, preferably an integer of from 2 to 3,000; b' is an integer of 1 or more, preferably an integer of from 100 to 14,500; c' is an integer of 0 or more, preferably an integer of from 0 to 1,000; and d' is an integer of 0 or more, preferably an integer of from 0 to 1,000; and 100≤a'+b'+c'+d'≤20,000, preferably 150≤a'+b'+c'+d'≤15,000. If the number of the siloxane unit, (a'+b'+c'+d'), is less than the aforesaid lower limit, reactivity may be worse or uniform application may be difficult. If the number is more than the aforesaid upper limit, the viscosity of the composition may be so large that the workability may be poor, for instance, smooth stirring and mixing are difficult.

The component (A') may be alone or in combination thereof.

<Component (B)>

In the silicone release agent composition of the present invention, component (B) is a linear or branched organopolysiloxane having at least one alkenyl group-containing organic group and at least one fluorine-containing organic group in one molecule, wherein a percentage of the number of the fluorine-containing organic group is 3% to 50%, based on the total number of groups each bonded to a silicon atom.

Component (B) may be alone or in combination thereof. Component (B) is preferably a linear or branched organopolysiloxane represented by the following formula (2):

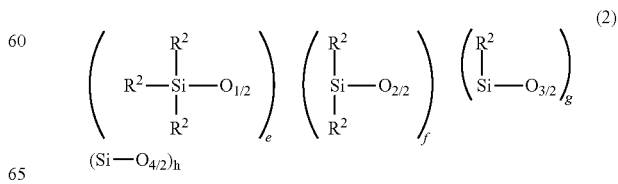

wherein R² is, independently of each other, a hydroxyl group, a substituted or unsubstituted, monovalent hydrocarbon group having 1 to 10 carbon atoms, or a fluorine-containing organic group, provided that at least one of R² is an alkenyl group-containing organic group having 2 to 10 carbon atoms and at least one of R² is a fluorine-containing organic group; e is an integer of 2 or more, f is an integer of 1 or more, g is an integer of 0 or more, h is an integer of 0 or more, and 50≤e+f+g+h≤5,000.

In the formula (2), e is an integer of 2 or more, preferably an integer of from 2 to 500; f is an integer of 1 or more, preferably an integer of from 50 to 2,500; g is an integer of 0 or more, preferably an integer of from 0 to 100; h is an integer of 0 or more, preferably an integer of from 0 to 100; and 50≤e+f+g+h≤5,000, preferably 80≤e+f+g+h≤3,000. If the number of the siloxane unit, (e+f+g+h), is less than the aforesaid lower limit or more than the aforesaid upper limit, the reactivity may be worse or the releasability or residual adhesive strength may be poor.

In the formula (2), R² is, independently of each other, a hydroxyl group, a monovalent hydrocarbon group having 1 to 10 carbon atoms, or a fluorine-containing organic group and at least one of R² is an alkenyl group-containing organic group having 2 to 10 carbon atoms. The alkenyl group-containing organic group has from 2 to 10 carbon atoms, preferably from 2 to 8 carbon atoms and may contain an oxygen atom. Examples of such include alkenyl groups such as a vinyl, allyl, hexenyl or octenyl group, and cycloalkenylalkyl groups such as a cyclohexenylethyl group. Examples of the alkenyl-containing monovalent hydrocarbon group which has an oxygen atom include acryloylalkyl groups and methacryloylalkyl groups such as an acryloylpropyl group, an acryloylmethyl group and a methacryloylpropyl group. The methylene chain may contain an ether bond, such as —(CH₂)₂—O—CH₂—CH=CH₂ and —(CH₂)₃—O—CH₂—CH=CH₂.

The amount of the alkenyl group contained in component (B) is such that the percentage of the number of the alkenyl group-containing organic group is preferably from 0.01 to 5%, more preferably from 0.03 to 4.5%, further preferably from 0.05 to 4%, based on the total number of the groups each bonded to a silicon atom of the organopolysiloxane, i.e., R² in the formula (2). If the amount is less than the aforesaid lower limit, the curability may be worse. When the amount is less than the aforesaid upper limit, the release layer obtained does not become too hard and adequate adhesion to a substrate and releasability are achieved.

The monovalent hydrocarbon group has from 1 to 10 carbon atoms and no aliphatic unsaturated bond. Examples of such include alkyl groups having 1 to 6 carbon atoms such as a methyl group, an ethyl group, a propyl group and a butyl group; cycloalkyl groups preferably having 5 to 8 carbon atoms such as a cyclohexyl group; aryl groups preferably having 6 to 10 carbon atoms such as a phenyl group and a tolyl group; aralkyl groups preferably having 7 to 10 carbon atoms such as a benzyl group; and those in which a part or all of the hydrogen atoms are substituted with a hydroxyl group, a cyano group, a halogen atom other than a fluorine atom, an alkoxysilyl group, a polyoxyalkylene group, an epoxy group or a carboxyl group. R² is preferably those other than aryl groups and aralkyl groups, and is more preferably a methyl group. When R² is an aryl group-containing organic group (i.e., an aryl group or an aralkyl group), the percentage of the number of the aryl group-containing organic groups is 0.01 to 20%, more preferably 0.01 to 15%, further preferably 0.01 to 10%, based on the total number of the group each bonded to a silicon atom of the organopolysiloxane, i.e., R² in the formula (2). If the amount is more than 20%, the compatibility with the component (A) may be too large, to attain an intended release performance. The term "aryl group-containing organic group" means an aryl group bonded to a silicon atom and an aralkyl group bonded to a silicon atom.

The fluorine-containing organic group is represented, for example, by the following structural formulas (3) to (5), preferably the structural formulas (3) and (4), still more preferably the structural formula (3).

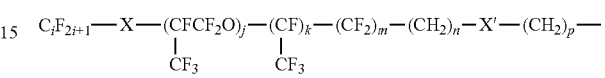

wherein i is an integer of from 0 to 5, j is an integer of from 1 to 10, k is 0 or 1, m is an integer of from 0 to 2, n is an integer of from 0 to 2, p is an integer of from 1 to 5, and X and X' are, independently of each other, an oxygen atom or a single bond.

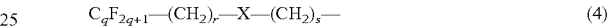

wherein q is an integer of from 1 to 20, r is an integer of from 0 to 2, s is an integer of from 1 to 6, and X is an oxygen atom or a single bond.

wherein t is an integer of from 1 to 10, u is 0 or 1, v is an integer of from 0 to 3, w is an integer of from 1 to 12, and X is an oxygen atom or a single bond.

The amount of the fluorine-containing organic group contained in the component (B) is such that the percentage of the number of the fluorine-containing organic groups is preferably from 3 to 50%, more preferably from 5 to 40%, still more preferably from 7 to 30%, based on the total number of the groups each bonded to a silicon atom of the organopolysiloxane, i.e., R² in the formula (2). If the amount is less than the aforesaid lower limit, good releasability may not be provided. If the amount is more than the aforesaid upper limit, curability may be worse.

The component (B) may be a linear or branched and preferably a compound represented by the following formula (6):

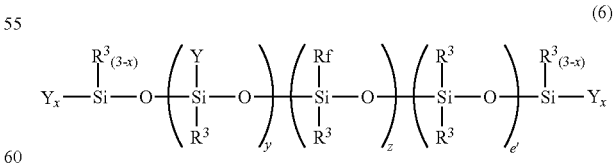

wherein R³ is, independently of each other, substituted or unsubstituted, monovalent hydrocarbon group having from 1 to 10 carbon atoms and having no aliphatic unsaturated bond, Y is an alkenyl group-containing organic group having from 2 to 10 carbon atoms, Rf is a fluorine-containing organic group, x is an integer of from 1 to 3, y is an integer of 0 or more, z is an integer of 1 or more, e' is an integer of 0 or more, and $50 \le y+z+e'+2 \le 5{,}000$.

In the formula (6), $R^3$ is, independently of each other, a substituted or unsubstituted, monovalent hydrocarbon group having from 1 to 10 carbon atoms and no aliphatic unsaturated bond. Examples of $R^3$ include the monovalent hydrocarbon group other than alkenyl group-containing organic group mentioned for $R^2$ in the formula (2). Among these, a methyl group, an ethyl group and a propyl group are preferred, and a methyl group is particularly preferred.

Y is an alkenyl group-containing organic group having 2 to 10 carbon atoms, preferably 2 to 8 carbon atoms and may contain an oxygen atom. Examples for Y are as the alkenyl group-containing organic group mentioned for $R^2$ in the aforesaid formula (2).

Rf is a fluorine-containing organic group as the fluorine-containing organic groups mentioned for the aforesaid formula (2).

In the formula (6), x is, independently of each other, an integer of 1 to 3, y is an integer of 0 or more, z is an integer of 1 or more, and e' is an integer of 0 or more, provided that $50 \le y+z+e'+2 \le 5{,}000$, preferably $80 \le y+z+e'+2 \le 3{,}000$.

The amount of component (B) is 0.1 to 50 parts by mass, preferably 0.3 to 30 parts by mass, more preferably 0.5 to 15 parts by mass, still more preferably 0.5 to 10 parts by mass, per total 100 parts by mass of component (A) and component (B). In particular, the upper limit may be less than 5 parts by mass. If the amount of component (B) is less than the aforesaid lower limit, the release force may be high.

More specifically, component (B) is represented by the following formulas, but it is not limited to them. In the following formulas, Me is a methyl group, Vi is a vinyl group, and Rf is a fluorine-containing organic group. The bonding order of the siloxane units shown in the parentheses is not limited to the following ones. In each of the following formulas, the number of the repeating siloxane units is an average value.

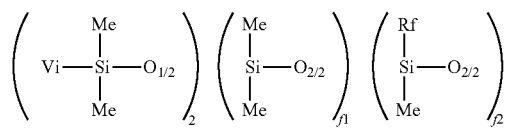

wherein f1 and f2 are the numbers that satisfy the equation, $50 \le 2+f1+f2 \le 5{,}000$ and such that the percentage of the number of the fluorine-containing organic groups is from 3% to 50% and the percentage of the number of the alkenyl group-containing organic groups is from 0.01 to 5%, each based on the total number of the groups each bonded to a silicon atom.

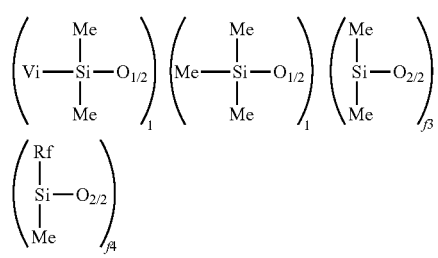

wherein f3 and f4 are the numbers that satisfy the equation, $50 \le 1+1+f3+f4 \le 5{,}000$ and such that the percentage of the number of the fluorine-containing organic groups is 3% to 50% and the percentage of the number of the alkenyl group-containing organic groups is 0.01 to 5%, each based on the total number of the groups each bonded to a silicon atom.

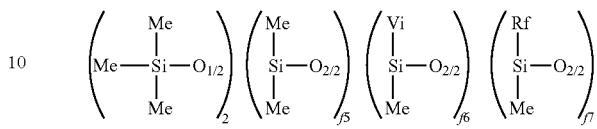

wherein f5, f6 and f7 are the numbers that satisfy the equation, $50 \le 2+f5+f6+f7 \le 5{,}000$ and such that the percentage of the number of the fluorine-containing organic groups is 3% to 50% and the percentage of the number of the alkenyl group-containing organic groups is 0.01 to 5%, based on the total number of groups each bonded to a silicon atom.

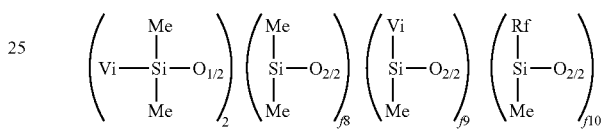

wherein f8, f9 and f10 are the numbers that satisfy $50 \le 2+f8+f9+f10 \le 5{,}000$ and such that the percentage of the number of the fluorine-containing organic groups is 3% to 50% and the percentage of the number of the alkenyl group-containing organic groups is 0.01 to 5%, based on the total number of the groups each bonded to a silicon atom.

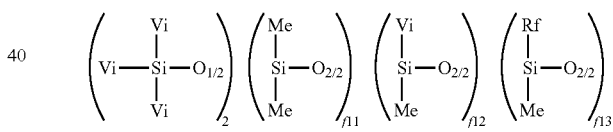

wherein f11, f12 and f13 are the numbers that satisfy the equation, $50 \le 2+f11+f12+f13 \le 5{,}000$ and such that the percentage of the number of the fluorine-containing organic groups is 3% to 50% and the percentage of the number of the alkenyl group-containing organic groups is 0.01 to 5%, based on the total number of the groups each bonded to a silicon atom.

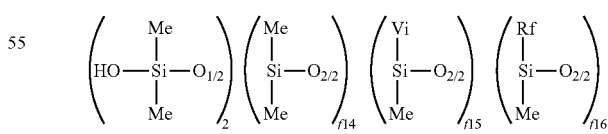

wherein f14, f15 and f16 are the numbers that satisfy the equation, $50 \le 2+f14+f15+f16 \le 5{,}000$ and such that the percentage of the number of the fluorine-containing organic groups is 3% to 50% and the percentage of the number of the alkenyl group-containing organic groups is 0.01 to 5%, based on the total number of the groups each bonded to a silicon atom.

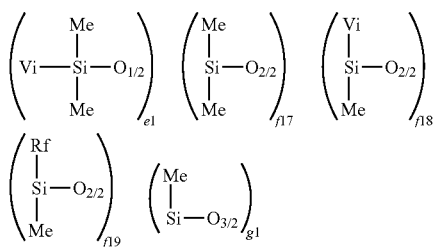

wherein e1, f17, f18, f19 and g1 are the numbers that satisfy the equation, 50≤e1+f17+f18+f19+g1≤5,000 and such that the percentage of the number of the fluorine-containing organic groups is 3% to 50% and the percentage of the number of the alkenyl group-containing organic groups is 0.01 to 5%, based on the total number of the groups each bonded to a silicon atom.

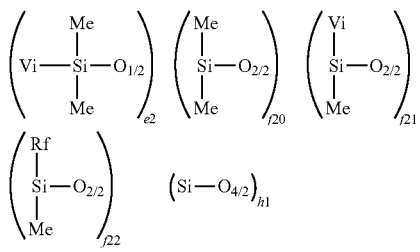

wherein e2, f20, f21, f22 and h1 are the numbers that satisfy the equation, 50≤e2+f20+f21+f22+h1≤5,000 and such that the percentage of the number of the fluorine-containing organic groups is 3% to 50% and the percentage of the number of the alkenyl group-containing organic groups is 0.01 to 5%, based on the total number of the groups each bonded to a silicon atom.

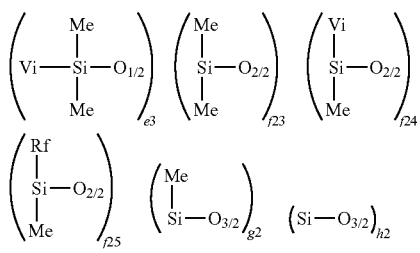

wherein e3, f23, f24, f25, g2 and h2 are the numbers that satisfy the equation, 50≤e3+f23+f24+f25+g2+h2≤5,000 and such that the percentage of the number of the fluorine-containing organic groups is 3% to 50% and the percentage of the number of the alkenyl group-containing organic groups is 0.01 to 5%, based on the total number of the groups each bonded to a silicon atom.

<Component (C)>

In the silicone release agent composition of the present invention, component (C) is an organohydrogenpolysiloxane having three or more hydrogen atoms each bonded to a silicon atom in one molecule and having no fluorine-containing organic group. The organohydrogenpolysiloxane may be alone or in combination thereof. The SiH group of component (C) addition-reacts with the alkenyl group of components (A) and (B), whereby the composition cures to form a film.

The amount of component (C) is such that a ratio of the number of the SiH groups in component (C) to the total number of the alkenyl groups in components (A) and (B) is 0.5 to 15, preferably 0.8 to 10, more preferably 1 to 7. If the ratio is less than the aforesaid lower limit, the adhesion with a substrate may be worse or curability may be poor. If the ratio is more than the aforesaid upper limit, the release force of the film from the adhesive may be too larger or a time period when a treatment bath is usable may be shorter.

The organohydrogenpolysiloxane (C) is preferably represented by the following average compositional formula (7):

$$R^4_{f'}H_{g'}SiO_{(4-f'-g')/2} \quad (7)$$

wherein $R^4$ is, independently of each other, a hydroxyl group or a substituted or unsubstituted, monovalent hydrocarbon group having no aliphatic unsaturated bond, and f' and g' are a positive number and satisfy the equation, f'+g'≤3.

Examples of the monovalent hydrocarbon group include alkyl groups preferably having 1 to 6 carbon atoms such as a methyl group, an ethyl group, a propyl group and a butyl group; cycloalkyl groups preferably having 5 to 8 carbon atoms such as a cyclohexyl group; aryl groups preferably having 6 to 10 carbon atoms such as a phenyl group and a tolyl group; aralkyl groups preferably having 7 to 10 carbon atoms such as a benzyl group; and those in which a part or all of the hydrogen atoms are substituted with a hydroxyl group, a cyano group, a halogen atom other than a fluorine atom, an alkoxysilyl group, a polyoxyalkylene group, an epoxy group or a carboxyl group. Among these, $R^4$ is preferably an alkyl group and an aryl group. Further, a methyl group, an ethyl group, a propyl group, and a phenyl group are preferred in view of improving an addition reaction rate.

When some of $R^4$ is an aryl group-containing organic group, the percentage of the number of the aryl group-containing organic groups is 0.1 to 40%, preferably 5 to 35%, more preferably 10 to 30%, based on the total number of the hydrogen atoms each bonded to a silicon atom and the groups each bonded to a silicon atom in the organohydrogenpolysiloxane of the formula (7) (i.e., the total number of $R^4$ and the SiH group). If the amount of the aryl group-containing organic group is more than the aforesaid upper limit, curability or adhesion to a substrate may be poor. The term "aryl group-containing organic group" means an aryl group bonded to a silicon atom and an aralkyl group bonded to a silicon atom.

In the formula (7), f' is a number larger than 0 and is preferably a real number of 0.1 to 2; g' is a number larger than 0 and is preferably a real number of 0.1 to 2, and f' and g' satisfy the equation, 0<f'+g'≤3, particularly 0.5<f'+g'≤2.8.

The organohydrogenpolysiloxane (C) may be linear, branched or cyclic or may be a mixture of them. Examples of the organohydrogenpolysiloxane include polymers or copolymers comprising at least one of $R^4HSiO_{2/2}$ unit, $HSiO_{3/2}$ unit and $R^4_2HSiO_{1/2}$ unit, and optionally at least one of $R^4_2SiO_{2/2}$ unit, $R^4SiO_{3/2}$ unit and $R^4_3SiO_{1/2}$ unit. $R^4$ is as described above. The total number of $R^4HSiO_{2/2}$ units and $R^4_2HSiO_{1/2}$ units is preferably at least three, more preferably from 5 to 300 in one molecule. Organohydrogenpolysiloxane (C) may comprise an $SiO_{4/2}$ unit in such an amount that the effects of the present invention are not detracted.

The organohydrogenpolysiloxane preferably has 3 to 300, more preferably 5 to 200, SiH groups in one molecule. If the number of the SiH group is less than the aforesaid lower limit or more than the aforesaid upper limit, curability may be worse or release force may be too large.

The organohydrogenpolysiloxane preferably has a viscosity at 25° C. of from 0.001 to 10 Pa·s, further preferably from 0.005 to 5 Pa·s. If the viscosity is too low, curability or adhesion to a substrate may be poor. If the viscosity is too high, workability or adhesion to a substrate may be worse.

Component (C) may be linear, branched or cyclic. Preferably, component (C) is represented by the following formula (8).

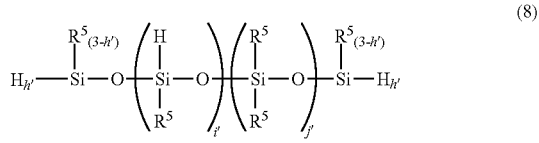

In the formula (8), $R^5$ is, independently of each other, a substituted or unsubstituted monovalent hydrocarbon group having from 1 to 10 carbon atoms and having no aliphatic unsaturated bond, and h' is, independently of each other, 0 or 1, i' is an integer of 1 or more, and j' is an integer of 0 or more, provided that h', i' and j' satisfy the equations, $3 \leq 2h'+i'$ and $3 \leq i'+j'+2 \leq 1,000$, preferably $10 \leq i'+j'+2 \leq 500$.

In the formula (8), $R^5$ is, independently of each other, a substituted or unsubstituted monovalent hydrocarbon group having from 1 to 10 carbon atoms and no aliphatic unsaturated bond. Examples of such include those mentioned for $R^4$ in the aforesaid formula (7). Among these, a methyl group, an ethyl group, a propyl group and a phenyl group are preferred, and a methyl group and a phenyl group are particularly preferred.

Component (C) further preferably comprises both the following components (C-1) and (C-2).

(C-1) organohydrogenpolysiloxane having at least one aryl group-containing organic group having 6 to 10 carbon atoms, wherein a percentage of the number of the aryl group-containing organic group is 0.1% to 40%, preferably 5 to 35%, more preferably 10 to 30%, based on the total number of the hydrogen atoms each bonded to a silicon atom and the groups each bonded to a silicon atom in component (C-1), and (C-2) organohydrogenpolysiloxane having no aryl group-containing organic group having 6 to 10 carbon atoms.

Component (C) preferably comprises both components (C-1) and (C-2) whereby curability with components (A) and (B) improves and a proper release force from adhesives and an adequate residual adhesive strength are achieved. The amount of component (C-1) is preferably 20 to 99.99 parts by mass, preferably 30 to 99.9 parts by mass, more preferably 40 to 99 parts by mass, relative to total 100 parts by mass of component (C).

Component (C) is, for instance, represented by the following formulas, but not limited to these. In the following formulas, Me is a methyl group and Ph is a phenyl group. The bonding order of the siloxane units in the parentheses is not limited to the following ones. In the following formulas, the number of the siloxane repeating units is an average value

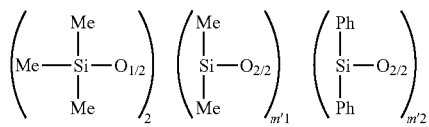

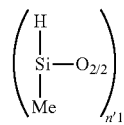

wherein m'1 is an integer of 0 or more, m'2 is an integer of 0 or more, and n'1 is an integer of from 3 to 300, and these are such that the percentage of the aryl group-containing organic groups is 0% to 40%, based on the number of the groups each bonded to a silicon atom.

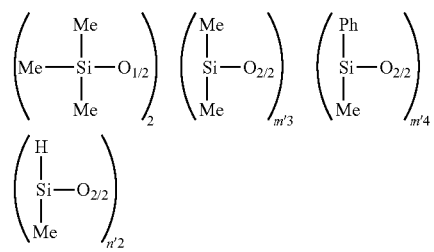

m'3 is an integer of 0 or more, m'4 is an integer of 0 or more, and n'2 is an integer of from 3 to 300, and these are such that the percentage of the aryl group-containing organic groups is 0% to 40%, based on the number of the groups each bonded to a silicon atom.

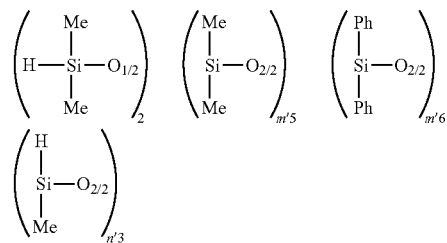

m'5 is an integer of 0 or more, m'6 is an integer of 0 or more, n'3 is an integer of from 1 to 298, and these are such that the percentage of the aryl group-containing organic group is 0% to 40%, based on the number of the groups each bonded to a silicon atom.

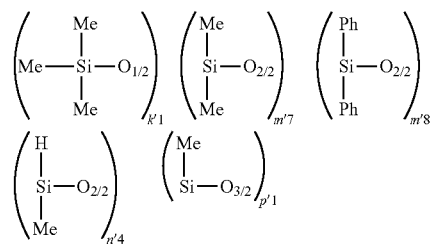

wherein k'1 is an integer of 2 or more, m'7 is an integer of 0 or more, m'8 is an integer of 0 or more, n'4 is an integer of from 3 to 300, and p'1 is an integer of 0 or more, and these are such that the percentage of the aryl group-containing organic groups is 0% to 40%, based on the number of the groups each bonded to a silicon atom.

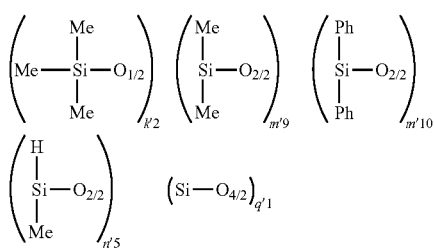

wherein k'2 is an integer of 2 or more, m'9 is an integer of 0 or more, m'10 is an integer of 0 or more, n'5 is an integer of from 3 to 300, and q'1 is an integer of 0 or more, and these are such that the percentage of the aryl group-containing organic groups is 0% to 40%, based on the number of the groups each bonded to a silicon atom.

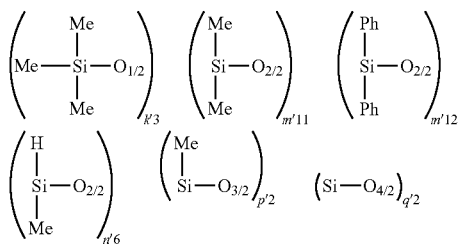

wherein k'3 is an integer of 2 or more, m'11 is an integer of 0 or more, m'12 is an integer of 0 or more, n'6 is an integer of from 3 to 300, p'2 is an integer of 0 or more, and q'2 is an integer of 0 or more, and these are such that the percentage of the aryl group-containing organic groups is 0% to 40%, based on the number of the groups each bonded to a silicon atom.

[Component (D)]

Component (D) is a catalyst to promote the addition reaction between components (A) and (B) and component (C). Any catalyst for promoting a hydrosilylation may be used. For instance, conventional platinum group metal catalysts may be used. Examples of the platinum group metal catalysts include platinum-based, palladium-based, rhodium-based, ruthenium-based or iridium-based catalysts. Among these, the platinum-based catalysts are particularly preferred. Examples of the platinum-based catalysts include chloroplatinic acid, an alcohol or aldehyde solution of chloroplatinic acid, a reaction product of chloroplatinic acid with an alcohol, and complexes of olefin or vinylsiloxane with chloroplatinic acid or platinum.

The amount of component (D) may be a catalytic amount. The catalytic amount is an amount effective for promoting an addition reaction of components (A) and (B) and component (C). The preferable amount of the catalyst is such that an amount of a platinum group metal is 1 to 5,000 ppm, preferably 5 to 500 ppm, further preferably 10 to 200 ppm, relative to a total mass of components (A), (B), and (C), so that a desirable cured film may be obtained. If the amount is less than 1 ppm, curability may be worse or adhesion to a substrate may poor. If the amount is more than 5,000 ppm, a time period when a treatment bath is usable may be shorter.

<Component (E)>

The present silicone release agent composition does not comprise (E) organohydrogenpolysiloxane having one or more hydrogen atoms each bonded to a silicon atom and having a fluorine-containing organic group in one molecule. Because the composition does not comprise the aforesaid substance (E), a proper release force and adequate residual adhesive strength may be achieved.

In the present invention, the SiH group in component (C) addition-reacts with the alkenyl group in components (A) and (B) to cause curing and form a film. Component (B) having the fluorine-containing organic group is poorly compatible with component (A) having the aforesaid specific amount of the aryl group-containing organic group. Accordingly, component (B) is localized during the curing to give a cured film in which a fluorine-containing silicone portion derived from component (B) is localized near the surface. If the composition further comprises the organohydrogenpolysiloxane (E) having a fluorine-containing organic group, substance (E) is also localized near the surface of the resulting cured film. Then, more SiH groups remain on the surface after curing. Consequently, a release force of the cured film from an adhesive is larger, resulting in heavy peeling. The present silicone release agent composition does not comprise substance (E) and, therefore, provides a release paper or film which is releasable with a smaller force from an adhesive and the adhesive after the releasing maintains a high residual adhesive strength.

The structure of the organohydrogenpolysiloxane (E) having one or more hydrogen atoms each bonded to a silicon atom and having a fluorine-containing organic group in one molecule is not particularly limited. Examples of the fluorine-containing organic group include the structural formulas (3) to (5) mentioned for the aforesaid component (B). Component (E) is represented, for example, by the following formula (9).

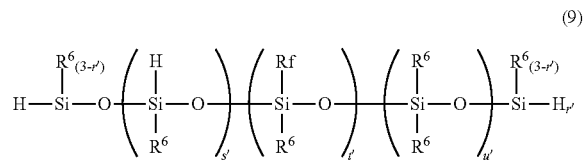

(9)

In the formula, $R^6$ is, independently of each other, substituted or unsubstituted monovalent hydrocarbon group having 1 to 10 carbon atoms and having no aliphatic unsaturated bond; Rf is a fluorine-containing organic group; and r' is, independently of each other, 0 or 1, s' is an integer of 1 or more, t' is an integer of 1 or more, and u' is an integer of 0 or more, provided that s', t', u' and r' satisfy the equations, $3 \leq 2r'+s'$ and $4 \leq s'+t'+u'+2 \leq 1{,}000$, preferably $8 \leq s'+t'+u'+2 \leq 500$. Examples of $R^6$ include those described for $R^4$ in the formula (7) of the aforesaid component (C).

<Component (F)>

The silicone release agent composition of the present invention may optionally comprise a controlling agent for addition reaction by curing. The controlling agent functions to prevent thickening or gelation of the silicone release agent composition before heat cured, for example, during the preparation or application to a substrate. It may be a conventional controlling agent such as organic nitrogen compounds, organophosphorus compounds, organosilicon compounds, acetylene-type compounds, unsaturated carboxylate esters, oximes, and organochloro compounds.

Examples of the controlling agent include acetylene-based alcohols such as 3-methyl-1-butyn-3-ol, 3,5-dimethyl-1-hexin-3-ol, 3-methyl-1-penten-3-ol, phenylbutynol, and 1-ethynylcyclohexanol; acetylene-based compounds such as 3-methyl-3-1-penten-1-yne and 3,5-dimethyl-1-hexyn-3- yne, reaction products between these acetylene-based compounds and an alkoxysilane, siloxane, or hydrogensilane; vinylsiloxanes such as cyclic tetramethylvinylsiloxane, unsaturated carboxylic acid esters such as diallyl maleate, dimethyl maleate, diallyl fumarate, and diethyl fumarate; organic nitrogen compounds such as benzotriazole; and other compounds such as organophosphorus compounds, oxime compounds, and organochloro compounds. The controlling agent may be alone or in combination thereof.

The amount of component (F) is 0 to 10 parts by mass, relative to total 100 parts by mass of components (A), (B) and (C). When component (F) is contained in the composition, the lower limit of its amount is preferably 0.05 part by mass. The amount is more preferably 0.1 to 5 parts by mass. If the amount of the controlling agent is more than the aforesaid upper limit, curability of the composition obtained may be poor.

The silicone release agent composition may further comprise other components in addition to components (A) to (D), as long as the purposes and effects of the present invention are not detracted. Examples of the other components include unreactive organopolysiloxanes such as polydimethylsiloxane and polydimethyldiphenylsiloxane; antioxidants such as a phenol-based, quinone-based, amine-based, phosphorus-based, phosphite-based, sulfur-based or thioether-based antioxidant; light stabilizers such as a triazole-based or benzophenone-based light stabilizer; flame retardants such as phosphoric acid ester-based, halogen-based, phosphorus-based, and antimony-based ones; antistatic agents such as cationic activator, anionic activator and nonionic activator; dyes; pigments; antifoaming agents; fillers; leveling agents; adhesion improvers; thickening agents; photopolymerization initiators; and reactive diluents.

The present silicone release agent composition is preferably dissolved in a solvent before use, whereby workability in coating is improved. Examples of the solvent include aromatic hydrocarbon-based solvents such as toluene and xylene; aliphatic hydrocarbon-based solvents such as hexane, heptane, octane, isooctane, decane, cyclohexane, methylcyclohexane, and isoparaffin; hydrocarbon-based solvents such as industrial gasoline (i.e. rubber volatile oil), petroleum benzine, and solvent naphtha; ketone-based solvents such as acetone, methyl ethyl ketone, 2-pentanone, 3-pentanone, 2-hexanone, 2-heptanone, 4-heptanone, methyl isobutyl ketone, diisobutyl ketone, acetonylacetone, and cyclohexanone; ester-based solvents such as ethyl acetate, propyl acetate, isopropyl acetate, butyl acetate, and isobutyl acetate; ether-based solvents such as diethyl ether, dipropyl ether, diisopropyl ether, dibutyl ether, 1,2-dimethoxyethane, and 1,4-dioxane; solvents having ester and ether moieties such as 2-methoxyethyl acetate, 2-ethoxyethyl acetate, propylene glycol monomethyl ether acetate, and 2-butoxyethyl acetate; siloxane-based solvents such as hexamethyldisiloxane, octamethyltrisiloxane, octamethylcyclotetrasiloxane, decamethylcyclopentasiloxane, tris(trimethylsiloxy)methylsilane, and tetrakis(trimethylsiloxy)silane; fluorine-modified aromatic hydrocarbon-based solvents such as m-xylene hexafluoride and benzotrifluoride; fluorine-modified ether-based solvents such as methyl perfluorobutyl ether, ethyl perfluorobutyl ether, and perfluoro(2-butyltetrahydrofuran); and fluorine-modified alkylamine-based solvents such as perfluorotributylamine and perfluorotripentylamine; and mixed solvents thereof. Among these, the aliphatic hydrocarbon-based solvents, ketone-based solvents, ester-based solvents, ether-based solvents, fluorine-modified aromatic hydrocarbon-based solvents, and fluorine-modified ether-based solvents are preferred; the aliphatic hydrocarbon-based solvents, ketone-based solvents, ester-based solvents, and ether-based solvents are particularly preferred; and hexane, heptane, methyl ethyl ketone, methyl isobutyl ketone, ethyl acetate, and diisopropyl ether are most preferred. These solvents may be used alone or in combination thereof.

The amount of the solvent is preferably such that a solution of the silicone release agent composition has a viscosity of 100 mPa·s or lower, but not particularly limited. On account of such a viscosity, coating workability of the solution comprising the silicone release agent composition is good, so that an amount and thickness of the applied solution may be controlled easily. For example, the amount of the solvent is preferably 25 to 100,000 parts by mass, more preferably from 100 to 10,000 parts by mass, per total 100 parts by mass of components (A) to (C), The silicone release agent composition of the present invention is desirably prepared by mixing components (A) to (C) and optionally the optional components uniformly in advance and, then, adding component (D) immediately before use.

Examples of the substrate to which the silicone release agent composition is applied include paper, plastic films, glass, metals and cloths. Examples of the paper include quality paper, coated paper, art paper, glassine paper, polyethylene laminate paper, kraft paper, Japanese paper, and synthetic paper. Examples of the plastic films include polyethylene film, polypropylene film, polyester film, polyimide film, polyamide film, polyvinyl chloride film, polyvinylidene chloride film, polyvinyl alcohol film, polycarbonate film, polytetrafluoroethylene film, polystyrene film, ethylene-vinyl acetate copolymer film, ethylene-vinyl alcohol copolymer film, triacetyl cellulose film, polyether ether ketone film, and polyphenylene sulfide film. The thickness and kind of the glass are not particular limited and the glass may be subjected to chemical reinforcement treatment. Glass fibers may also be used as a single item or a composite with resin. Examples of the cloths include natural fiber cloth, synthetic fiber cloth, and artificial leather. Examples of the metals include aluminum foil, copper foil, gold foil, silver foil, and nickel foil. Among these, paper and plastic films are preferred, and a polyester film is particularly preferred.

For further improvement of the adhesion between the substrate and the release layer, the substrate may be subjected to primer treatment, corona treatment, etching treatment or plasma treatment in advance.

The coating may be conducted according to any known coating method, such as comma coater, lip coater, roll coater, die coater, knife coater, blade coater, rod coater, bar coater, kiss coater, gravure coater, spin coater, spray coater, screen coating, dip coating and cast coating.

The coating amount of the release agent composition is selected such that the thickness of the release layer after curing is 0.03 to 5 μm, particularly 0.05 to 3.0 μm. Curing may be conducted at room temperature or in heating at a temperature of 50 to 200° C. for 20 seconds to 10 minutes, but conditions are not limited thereto.

The silicone release agent composition is applied on one side or both sides of a substrate and, then, is cured in predetermined conditions to obtain a release liner, such as a release paper or film, which have a release layer on the one side or both sides. The release liner having the release layer on both sides is obtained by applying the release agent composition on one side of a substrate and curing the composition and, then, applying the release agent composition on the other side and curing it.

The release liner comprising the present release agent composition is used, for instance, by adhering the release liner to an adhesive sheet having an adhesive substance on a substrate to protect the surface of the adhesive substance; applying an adhesive substance to the release liner and then adhering the adhesive surface to a substrate to transfer the substance to the substrate; applying an adhesive substance to a surface of the release liner opposite a surface to which the silicone release agent composition has been applied to obtain a layered substance with an adhesive; and by applying an adhesive substance on a first release liner and then applying a second release liner on the opposite surface of the adhesive substance to obtain a double-side adhesive sheet.

Examples of the adhesive substance include various adhesives such as acrylic resin-based pressure-sensitive adhesives, rubber-based adhesives, and silicone-based adhesives; and various bonding agents such as acrylic resin-based bonding agents, synthetic rubber-based bonding agents, silicone-based bonding agents, epoxy resin-based bonding agents, and polyurethane-based bonding agents. Additional examples include asphalt, tacky food such as rice cake, paste and birdlime.

The adhesive substance is preferably a silicone-based adhesive, further preferably an addition-cured silicone adhesive or peroxide-cured silicone adhesive, most preferably an addition-cured silicone adhesive. A release layer composed of a cured product of the silicone release agent composition of the present invention is releasable with a weak force from the addition-cured silicone adhesive as well as the peroxide-cured silicone adhesive. The adhesive after the releasing maintains a high residual adhesive strength.

The silicone-based adhesive may be any known adhesive composition and not particularly limited. Examples of such include an adhesive composition comprising the following components (G) and (H):

(G) linear or branched polydiorganosiloxane in an amount of 25 to 80 parts by mass, per total 100 parts by mass of components (G) and (H), and (H) organopolysiloxane comprising an $R^7_3SiO_{1/2}$ unit and an $SiO_{4/2}$ unit and optionally a hydroxyl group or alkoxy group bonded to a silicon atom, in an amount of 75 to 20 parts by mass, per total 100 parts by mass of components (G) and (H), wherein $R^7$ is, independently of each other, a substituted or unsubstituted monovalent hydrocarbon group having 1 to 10 carbon atoms, and a molar ratio of ($R^7_3SiO_{1/2}$ unit)/($SiO_{4/2}$ unit) is 0.5 to 1.5.

Examples of the adhesive composition include an addition-curable or peroxide-curable silicone composition.

Examples of the addition-curable silicone adhesive preferably include an adhesive composition comprising the following components (G1) to (J):

(G1) linear or branched polydiorganosiloxane having two or more alkenyl groups in one molecule, in an amount of 25 to 80 parts by mass, per total 100 parts by mass of components (G1) and (H1), (H1) organopolysiloxane comprising an $R^7_3SiO_{1/2}$ unit and an $SiO_{4/2}$ unit and optionally a hydroxyl group or alkoxy group bonded to a silicon atom, in an amount of 75 to 20 parts by mass, per total 100 parts by mass of components (G1) and (H1), wherein $R^7$ is, independently of each other, a substituted or unsubstituted monovalent hydrocarbon group having 1 to 10 carbon atoms, and a molar ratio of ($R^7_3SiO_{1/2}$ unit)/($SiO_{4/2}$ unit) is 0.5 to 1.5, (I) organohydrogenpolysiloxane having three or more SiH groups in one molecule, in such an amount that a ratio of the number of the SiH group in component (I) to the number of the alkenyl group in component (G1) is from 0.5 to 20, and a catalytic amount of (J) platinum group metal catalyst.

Examples of the peroxide-curable silicone adhesive preferably include adhesive composition comprising the following components (G2) to (K):

(G2) linear or branched polydiorganosiloxane in an amount of 25 to 80 parts by mass, per total 100 parts by mass of components (G2) and (H2), (H2) organopolysiloxane comprising an $R^7_3SiO_{1/2}$ unit and an $SiO_{4/2}$ unit and optionally a hydroxyl group or alkoxy group bonded to a silicon atom, in an amount of 75 to 20 parts by mass, per total 100 parts by mass of components (G2) and (H2), wherein $R^7$ is, independently of each other, a substituted or unsubstituted monovalent hydrocarbon group having 1 to 10 carbon atoms, and a molar ratio of ($R^7_3SiO_{1/2}$ unit)/($SiO_{4/2}$ unit) is 0.5 to 1.5, and (K) organic peroxide curing agent in an amount of 0.1 to 10 parts by mass, per total 100 parts by mass of components (G2) and (H2).

The layer composed of the cured silicone release agent composition has excellent release properties from an adhesive layer and, therefore, may be used for casting paper which is a layered substance having the adhesive layer, wrapping paper having an adhesive substance, adhesive tape, and adhesive label. The cured layer is also used as a protective sheet for manufacture, processing, or transporting various materials such as metal plate, resin plate and glass plate, optical parts such as polarizing plates and light diffusion plates, and various displays, or as a release film for molding materials of a dielectric ceramic layer.

EXAMPLES

The present invention will be explained below in further detail with reference to a series of the Examples and the Comparative Examples, though the present invention is in no way limited by these Examples.

Hereinafter, "part" represents part by mass. The properties were determined by the following test methods. "Me" represents a methyl group, "Vi" represents a vinyl group, and "Ph" represents a phenyl group. The bonding order of the siloxane units shown in the parentheses is not limited to the following ones.

The following are components (A) to (E) incorporated in the silicone release agent compositions in the Examples and the Comparative Examples.

(A-1)

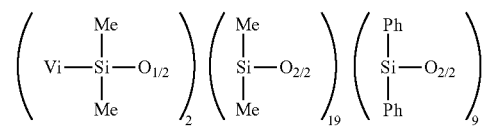

wherein the percentage of the number of the alkenyl group-containing organic groups is 3.2% and the percentage of the number of the aryl group-containing organic groups is 29.0%, each based on the total number of the groups each bonded to a silicon atom.

(A-2)

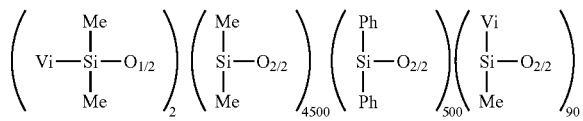

wherein the percentage of the number of the alkenyl group-containing organic groups is 0.9% and the percentage of the number of the aryl group-containing organic groups is 9.8%, each based on the total number of the groups each bonded to a silicon atom.

(A-3) for Comparative Example

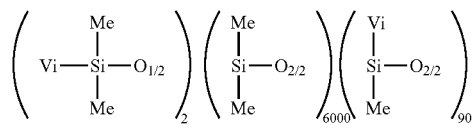

wherein the percentage of the number of the alkenyl group-containing organic groups is 0.8%, based on the total number of the groups each bonded to a silicon atom and no aryl group-containing organic group is contained.

(B-1)

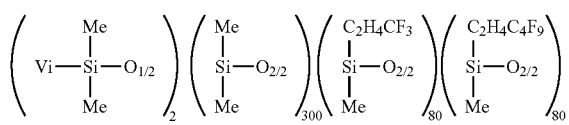

wherein the percentage of the number of the fluorine-containing organic groups is 17.3% and the percentage of the number of the alkenyl group-containing organic groups is 0.2%, each based on the total number of the groups each bonded to a silicon atom.

(B-2)

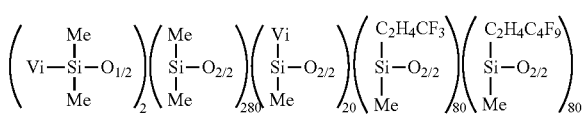

wherein the percentage of the number of the fluorine-containing organic groups is 17.3% and the percentage of the number of the alkenyl group-containing organic groups is 2.4%, each based on the total number of the groups each bonded to a silicon atom.

(B-3)

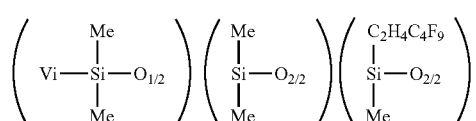

wherein the percentage of the number of the fluorine-containing organic groups is 14.0% and the percentage of the number of the alkenyl group-containing organic groups is 0.7%, each based on the total number of the groups each bonded to a silicon atom.

(B-4)

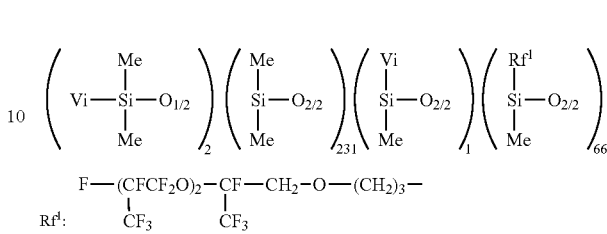

wherein the percentage of the number of the fluorine-containing organic groups is 11.0% and the percentage of the number of the alkenyl group-containing organic groups is 0.5%, each based on the total number of the groups each bonded to a silicon atom.

(B-5)

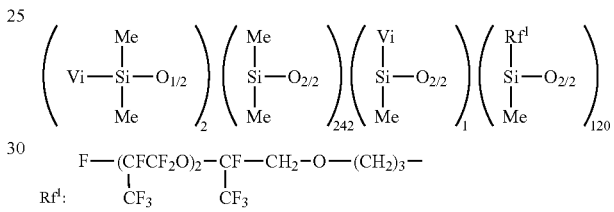

wherein the percentage of the number of the fluorine-containing organic groups is 16.4% and the percentage of the number of the alkenyl group-containing organic groups is 0.4%, each based on the total number of the groups each bonded to a silicon atom.

(C-1)

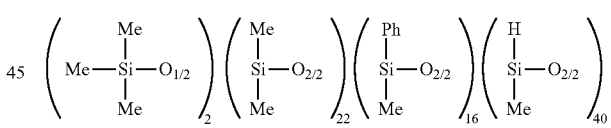

wherein the percentage of the number of the aryl group-containing organic groups is 19.8%, based on the total number of the groups each bonded to a silicon atom.

(C-2-1)

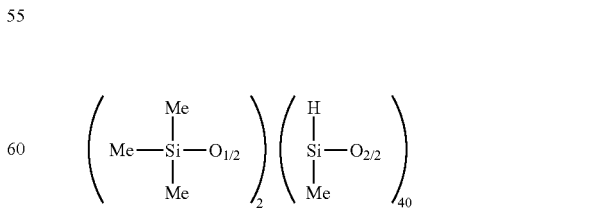

wherein the percentage of the number of the aryl group-containing organic groups is 0%, based on the total number of the groups each bonded to a silicon atom.

(C-2-2)

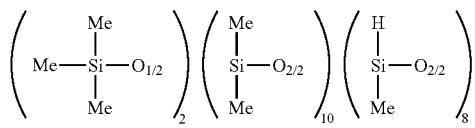

wherein the percentage of the number of the aryl group-containing organic groups is 0%, based on the total number of the groups each bonded to a silicon atom.

(D-1)

A solution of 1,3-divinyl-1,1,3,3-tetramethyldisiloxane platinum (0) complex in toluene, which contains 0.5 mass % of platinum.

(E-1)

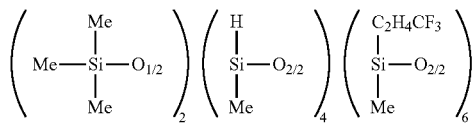

wherein the percentage of the number of the fluorine-containing organic groups is 23.1%, based on the total number of the groups each bonded to a silicon atom.

(E-2)

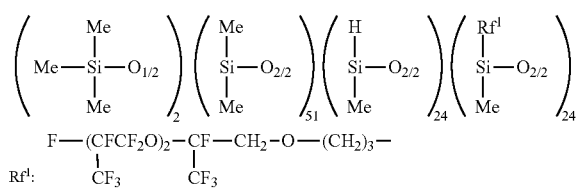

wherein the percentage of the number of the fluorine-containing organic groups is 11.8%, based on the total number of the groups each bonded to a silicon atom.

(F) 1-Ethynylcyclohexanol

<Preparation of a Silicone Release Agent Composition>

Components (A), (B), (C) and (E) and the solvent in the amounts as shown in Table 1 or 2 and 0.5 part by mass of component (F) were put in a flask, stirred and dissolved. Component (D) in the amount shown in Table 1 or 2 was added to the obtained solution, followed by stirring and mixing to prepare a silicone release agent composition. A coated product (i.e., release film) was produced using the obtained silicone release agent composition in the method described below and, then, evaluated.

<Preparation of a Silicone Release Film>

Examples 1 to 3, and Comparative Example 1

The silicone release agent composition obtained was coated on a PET film having a thickness of 38 μm in an amount of 1.0 g/m² as a solid amount with a bar coater and heated to cure in a hot air dryer of 120° C. for 40 seconds to form a release layer and thus obtain a release film.

Examples 4 to 8, and Comparative Examples 2 to 9

The silicone release agent composition obtained was coated on a PET film having a thickness of 38 μm in an amount of 0.3 g/m² as a solid amount with a bar coater and heated to cure in a hot air dryer of 140° C. for 30 seconds to form a release layer and thus obtain a release film.

<Preparation of an Adhesive Tape for Evaluation>

(Adhesive tape A)

A silicone adhesive composition for preparing adhesive tape A was prepared as follows.

36 Parts by mass of (G1) dimethylpolysiloxane represented by the following formula:

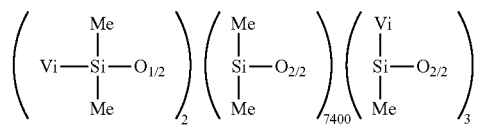

106.7 parts by mass of a 60 mass % solution of (H1) polysiloxane having $Me_3SiO_{0.5}$ units and $SiO_2$ units in toluene, wherein a molar ratio, $Me_3SiO_{0.5}$ unit/$SiO_2$ unit, is 0.85, and weight-average molecular weight is 4,000, 0.32 part by mass of (I) methylhydrogenpolysiloxane represented by the following formula:

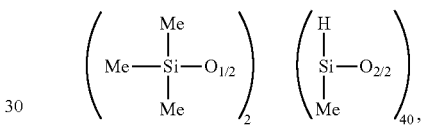

and 0.25 part by mass of 1-ethynylcyclohexanol were mixed and diluted with toluene to obtain a composition containing 60 mass % of the effective components.

To 100 parts by mass of the composition obtained were added 50 parts by mass of toluene and then, 0.5 part by mass of a solution in toluene of (J)1,3-divinyl-1,1,3,3-tetramethyldisiloxane platinum (0) complex containing 0.5 mass % of platinum, followed by mixing to prepare a silicone adhesive composition I.

The silicone adhesive composition I was coated on a polyimide film having a thickness of 25 μm and a width of 25 mm with an applicator in such an amount as to give a thickness of 30 μm after cured and, then, heated to cure at 130° C. for 1 minute to obtain adhesive tape A.

(Adhesive Tape B)

A silicone adhesive composition for preparing adhesive tape B was prepared as follows.

38 Parts by mass of (G2) dimethylpolysiloxane represented by the following formula:

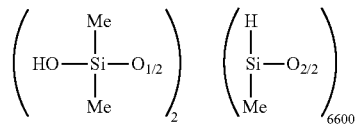

and 103.3 parts by mass of a 60 mass % solution in toluene of (H2) polysiloxane comprising $Me_3SiO_{0.5}$ units and $SiO_2$ units, wherein a molar ratio, ($Me_3SiO_{0.5}$ units)/($SiO_2$ units), is 0.80 and weight-average molecular weight is 3,000, were mixed and diluted with toluene to obtain a composition comprising 60 mass % of the effective components.

To 100 parts by mass of the obtained composition were added 50 parts by mass of toluene and, then, 3.0 parts by mass of a 40 mass % solution of (K) benzoyl peroxide in xylene, followed by mixed to prepare silicone adhesive composition solution II.

The silicone adhesive composition II was coated on a polyimide film having a thickness of 25 μm and a width of 25 mm with an applicator in such an amount as to give a thickness of 40 μm after cured a thickness after curing 40 μm and, then, heated to cure at 165° C. for 2 minutes to obtain adhesive tape B.

A release force of the release film obtained in the Examples and the Comparative Examples and a residual adhesion of the adhesive tape after peeling the release film off were determined according to the following methods.

<Release Force>

The adhesive tape A or the adhesive tape B was put on the release film, pressure-bonded by moving a 2-kg roller back and forth once and subjected to aging. Then, the adhesive tape was released from the release film, using a tensile tester at a rate of 0.3 m/min in a 180° direction and the release force (N/25 mm) was determined. The aging was performed in either of the following two conditions:

allowed to stand for one day under a pressure of 70 g/cm² at 25° C.

allowed to stand for 7 days under a pressure of 20 g/cm² at 70° C.

<Residual Adhesion>

The adhesive tape comprising the PI film of a 25-μm thickness and the adhesive layer from which the release film had been peeled off in the aforesaid test was attached to a stainless steel plate and a 2-kg roller was moved back and force thereon once to cause pressure bonding, which was then allowed to stand at room temperature for 2 hours. Then, a force in N/25 mm required for peeling the adhesive tape from the stainless steel plate in a direction of 180° at a rate of 0.3 m/min was determined by a tensile tester, hereinafter referred to as Adhesive strength 1. For comparison, an unused adhesive tape A or adhesive tape B was attached to a stainless steel plate and a 2-kg roller was moved back and force thereon once to cause pressure bonding. Similarly, a force required for peeling the adhesive tape from the stainless steel plate was determined, hereinafter referred to as Adhesive force 2. A residual adhesive strength in percent of the adhesive tape after released from the release film, in comparison with the unused adhesive tape, was calculated according to the following equation:

Residual adhesion in percent=(Adhesive force 1)×100/(Adhesive force 2)

TABLE 1

| Parts by mass | | Example 1 | 2 | 3 | 4 | 5 | 6 | 7 | 8 |
|---|---|---|---|---|---|---|---|---|---|
| Component (A), with no fluorine atom | A-1 aryl of 29.0% | 100 | 100 | 100 | | | | | |
| | A-2 aryl of 9.8% | | | | 100 | 100 | 100 | 100 | 100 |
| | A-3 no aryl | | | | | | | | |
| Component (B), with fluorine atoms | B-1 | 2.40 | 1.20 | | 5.12 | | | | |
| | B-2 | | 1.20 | | | 5.12 | | | |
| | B-3 | | | | | | 10.20 | | |
| | B-4 | | | 2.40 | | | | 6.83 | 6.83 |
| | B-5 | | | | | | | | 6.83 |
| Component (C) with no fluorine atom | C-1 aryl of 19.8% | 20.5 | 20.5 | 20.5 | 8.87 | 8.87 | 8.87 | 8.87 | 8.87 |
| | C-2-1 no aryl | | | | | | | 1.60 | |
| | C-2-2 no aryl | 5.25 | 6.00 | 5.35 | 4.00 | 3.40 | 2.00 | | 2.10 |
| Solvent | Hexane | 240 | 240 | 240 | 1000 | 1000 | 1000 | 1000 | 1000 |
| | Methyl ethyl ketone | 240 | 240 | 240 | 1000 | 1000 | 1000 | 1000 | 1000 |
| Component (D) | D-1 | 4.0 | 4.0 | 4.0 | 3.4 | 3.4 | 3.4 | 3.4 | 3.4 |
| Mass ratio, (A)/(B) | | 97.7/ 2.3 | 97.7/ 2.3 | 97.7/ 2.3 | 90.7/ 9.3 | 90.7/ 9.3 | 93.6/ 6.4 | 93.6/ 6.4 | 93.6/ 6.4 |
| H/Vi ratio *¹ | | 2.4 | 2.4 | 2.4 | 3.1 | 3.1 | 2.8 | 3.4 | 2.9 |
| Release force from adhesive A, N/25 mm | 25° C. for 1 day | 0.05 | 0.05 | 0.04 | 0.05 | 0.05 | 0.03 | 0.04 | 0.03 |
| | 70° C. for 7 days | 0.05 | 0.06 | 0.04 | 0.07 | 0.06 | 0.05 | 0.06 | 0.06 |
| Residual adhesion of adhesive A, % | 25° C. for 1 day | 97 | 98 | 97 | 97 | 97 | 99 | 97 | 98 |
| | 70° C. for 7 days | 97 | 96 | 97 | 96 | 97 | 97 | 98 | 97 |
| Release force from adhesive B, N/25 mm | 25° C. for 1 day | 0.06 | 0.06 | 0.05 | 0.06 | 0.05 | 0.04 | 0.06 | 0.04 |
| | 70° C. for 7 days | 0.07 | 0.06 | 0.06 | 0.08 | 0.07 | 0.07 | 0.07 | 0.06 |
| Residual adhesion of adhesive B, % | 25° C. for1 day | 95 | 95 | 96 | 95 | 95 | 97 | 96 | 96 |
| | 70° C. for 7 days | 95 | 94 | 96 | 95 | 96 | 96 | 95 | 95 |

*¹ A ratio of the number of the SiH group in component (C) to the total number of the Vi group in components (A) and (3)

TABLE 2

| Parts by mass | | Comparative Example | | | | | | | | |
|---|---|---|---|---|---|---|---|---|---|---|
| | | 1 | 2 | 3 | 4 | 5 | 6 | 7 | 8 | 9 |
| Component (A), with no fluorine atom | A-1 aryl of 29.0% | 100 | | | | | | | | |
| | A-2 aryl of 9.8% | | 100 | 100 | 100 | | | | | |
| | A-3 no aryl | | | | | 100 | 100 | 100 | | |
| Component (B), with fluorine atoms | B-1 | | | | | | | | 50 | |
| | B-2 | | | | | | | | 50 | |
| | B-3 | | | | | 10.2 | | | | |
| | B-4 | | | 6.83 | 6.83 | | 6.83 | 6.83 | | 100 |
| | B-5 | | | | | | | | | |
| Component (C) with no fluorine atom | C-1 aryl of 19.8% | 20.5 | 8.87 | 8.87 | 8.87 | | | 8.87 | | |
| | C-2-1 no aryl | | | | | 3.00 | 3.00 | | | |
| | C-2-2 no aryl | | | | 1.00 | 3.40 | 2.00 | 1.70 | | |
| Component (E) with fluorine atoms | E-1 | | | | | | | | 13.5 | |
| | E-2 | | | 8.70 | 4.30 | | | | | 8.70 |
| Solvent | Hexane | 240 | 1000 | 1000 | 1000 | 1000 | 1000 | 1000 | 1000 | 1000 |
| | Methyl ethyl ketone | 240 | 1000 | 1000 | 1000 | 1000 | 1000 | 1000 | 1000 | 1000 |
| Component (D) | D-1 | 4.0 | 3.4 | 3.4 | 3.4 | 3.4 | 3.4 | 3.4 | 3.4 | 3.4 |
| Mass ratio, (A)/(B) | | 100/0 | 100/0 | 93.6/6.4 | 93.6/6.4 | 90.7/9.3 | 93.6/6.4 | 93.6/6.4 | 0/100 | 0/100 |
| H/Vi ratio [2] | | 1.9 | 2.3 | 2.8 | 2.8 | 3.1 | 2.8 | 2.8 | 2.0 | 2.0 |
| Release force from adhesive A, N/25 mm | 25° C. for 1 day | —[1] | 7.9 | 0.4 | 0.2 | 3.2 | 2.1 | 3.2 | 0.05 | 0.02 |
| | 70° C. for 7 days | —[1] | 10.4 | 3.5 | 2.4 | 7.8 | 7.2 | 8.2 | 0.06 | 0.04 |
| Residual adhesion of adhesive A, % | 25° C. for 1 day | —[1] | 92 | 94 | 94 | 87 | 90 | 85 | 93 | 96 |
| | 70° C. for 7 days | —[1] | 93 | 89 | 91 | 86 | 87 | 82 | 94 | 92 |
| Release force from adhesive B, N/25 mm | 25° C.for 1 day | —[1] | 7.0 | 0.3 | 0.5 | 6.2 | 4.9 | 5.5 | 0.05 | 0.04 |
| | 70° C. for 7 days | —[1] | 8.2 | 3.2 | 3.3 | 7.4 | 7.4 | 6.1 | 0.07 | 0.06 |
| Residual adhesion of adhesive B, % | 25° C. for 1 day | —[1] | 87 | 88 | 89 | 86 | 86 | 85 | 93 | 94 |
| | 70° C. for 7 days | —[1] | 85 | 86 | 87 | 86 | 86 | 81 | 91 | 92 |

[1] The release layer remained on the adhesives
[2] A ratio of the total number of the SiH group in components (C) and (E) to the total number of the Vi group in components (A) and (B)

As seen in Table 2, the release films obtained from the silicone release agent compositions of Comparative Examples 1 and 2 lacking a fluorine-containing silicone had a high release force from the adhesive layer and a part of the release layer remained on the adhesive layer. The release films obtained from the silicone release agent compositions of Comparative Examples 3 and 4 comprising a fluorine-containing organohydrogenpolysiloxane showed heavy peeling after 7 days at 70° C., and the residual adhesion of the adhesive layer was low. The release films obtained from the silicone release agent compositions of Comparative Examples 5 to 7 in which the fluorine-free organopolysiloxane has no aryl group showed the small effect for light peeling, that is the release force from the adhesive layer was high, because the amount of the fluorine-containing silicone was small. In the release films obtained from the silicone release agent compositions of Comparative Examples 8 and 9 lacking a fluorine-free organopolysiloxanes, the residual adhesion was somewhat less because an uncrosslinked component remained due to low reactivity.

On the other hand, as seen in Table 1, the release film of the present silicone release agent composition comprising the silicone lacking a fluorine atom and having the specified amount of an aryl group and a fluorine-containing silicone was released with a very low force from the hydrosilyl addition-cured adhesive tape A and the peroxide-cured adhesive tape B, though the amount ratio of the fluorine-containing silicone to the fluorine free silicone is small. In addition, the release film obtained from the present silicone release agent composition maintains its low release force even after aging for 7 days at 70° C. This low release force is comparable to those of the release films obtained from the compositions of Comparative Examples 8 and 9 containing only the fluorine-containing silicone. This means that although the present release agent composition contains the fluorine-containing silicone in a small amount ratio, it can have a light peeling force comparable to those of the release agent compositions containing a large amount of the fluorine-containing silicone. This is presumably because the fluorine-containing silicone is localized near the surface of the cured film obtained from the present silicone release agent composition. Further, while the present silicone release agent composition attains a light peeling force, it can maintain the higher residual adhesion both after one day at 25° C. and after 7 days at 70° C., compared to the compositions of Comparative Examples 8 and 9.

INDUSTRIAL APPLICABILITY

The cured product of the release agent composition according to the present invention contains a less amount of the fluorine-containing silicone, so that it can be produced at lower costs. Further, the present release film or sheet is released with a very small force from the silicone adhesive and the adhesive after releasing maintains a high residual adhesion. Therefore, a release paper and a release film having excellent releasability are provided.

The invention claimed is:

1. A silicone release agent composition comprising the following components (A), (B), (C) and (D):

70 to 99.7 parts by mass of (A) linear or branched organopolysiloxane represented by the following general formula (1) and having at least two alkenyl group-containing organic groups and at least one aryl group-containing organic group in one molecule and having no fluorine-containing organic group, wherein a percentage of the number of the alkenyl group-containing organic group is 0.05 to 5% and a percentage of the number of the aryl group-containing organic groups is 5 to 40%, each based on the total number of groups each bonded to a silicon atom,

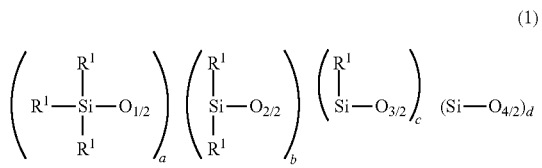

(1)

wherein $R^1$ is, independently of each other, a hydroxyl group or a substituted or unsubstituted, monovalent hydrocarbon group having 1 to 10 carbon atoms and at least two of $R^1$ are an alkenyl group-containing organic group having 2 to 10 carbon atoms and at least one of $R^1$ is an aryl group-containing organic group having 6 to 10 carbon atoms, a is an integer of 2 or more, b is an integer of 1 or more, c is an integer of 0 or more, d is an integer of 0 or more, and $30 \leq a+b+c+d \leq 20,000$;

30 to 0.3 part by mass of (B) linear or branched organopolysiloxane having at least one alkenyl group-containing organic group and at least one fluorine-containing organic group in one molecule, wherein a percentage of the number of the alkenyl group-containing organic group is 0.03 to 4.5% and a percentage of the number of the fluorine-containing organic group is 5 to 40%, each based on the total number of groups each bonded to a silicon atom, provided that the total amount of components (A) and (B) is 100 parts by mass;

(C) organohydrogenpolysiloxane having three or more hydrogen atoms each bonded to a silicon atom in one molecule and having no fluorine-containing organic group, comprising the following components (C-1) and (C-2):

(C-1) organohydrogenpolysiloxane having at least one aryl group-containing organic group having 6 to 10 carbon atoms, wherein a percentage of the number of the aryl group-containing organic group is 0.1% to 40%, based on the total number of the hydrogen atoms each bonded to a silicon atom and the groups each bonded to a silicon atom in component (C-1), (C-2) organohydrogenpolysiloxane having no aryl group-containing organic group having 6 to 10 carbon atoms, wherein the amount of component (C-1) is 40 to 99 parts by mass, relative to total 100 parts by mass of component (C), in such an amount that a ratio of the number of the SiH group in component (C) to the total number of the alkenyl group in components (A) and (B) is from 0.5 to 15; and a catalytic amount of (D) platinum group metal catalyst, provided that the silicone release agent composition does not comprise (E) organohydrogenpolysiloxane having one or more hydrogen atoms each bonded to a silicon atom and having a fluorine-containing organic group.

2. The silicone release agent composition according to claim 1 further comprising 0.05 to 10 parts by mass of (F) reaction controlling agent, relative to total 100 parts by mass of components (A), (B) and (C).

3. The silicone release agent composition according to claim 1, wherein a mass ratio of component (A) to component (B) is 90/10 to 99.5/0.5.

4. The silicone release agent composition according to claim 1, wherein component (B) is represented by the following formula (6):

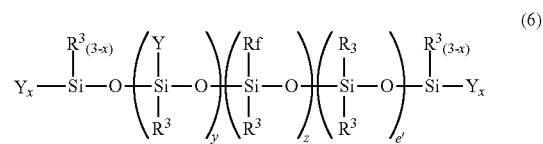

(6)

wherein $R^3$ is, independently of each other, a substituted or unsubstituted, monovalent hydrocarbon group having 1 to 10 carbon atoms and no aliphatic unsaturated bond, Y is an alkenyl group-containing organic group having 2 to 10 carbon atoms, Rf is a fluorine-containing organic group, x is an integer of 1 to 3, y is an integer of 0 or more, z is an integer of 1 or more, e' is an integer of 0 or more and y, z and e' satisfy an equation, $50 \leq y+z+e'+2 \leq 5,000$.

5. The silicone release agent composition according to claim 1, wherein the fluorine-containing organic group in component (B) is represented by the following structural formula (3), (4) or (5):

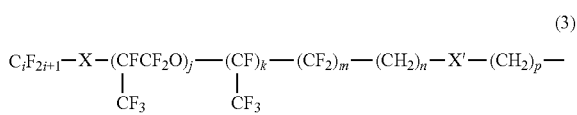

(3)

wherein i is an integer of from 0 to 5, j is an integer of from 1 to 10, k is 0 or 1, m is an integer of from 0 to 2, n is an integer of from 0 to 2, p is an integer of from 1 to 5, and X and X' are, independently of each other, an oxygen atom or a single bond;

(4)

wherein q is an integer of from 1 to 20, r is an integer of from 0 to 2, s is an integer of from 1 to 6 and X is an oxygen atom or a single bond;

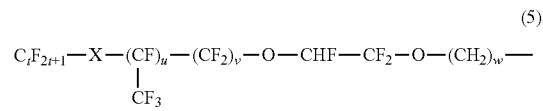

(5)

wherein t is an integer of from 1 to 10, u is 0 or 1, v is an integer of from 0 to 3, w is an integer of from 1 to 12, and X is an oxygen atom or a single bond.

6. The silicone release agent composition according to claim 5, wherein the fluorine-containing organic group in component (B) is represented by the structural formula (3).

7. The silicone release agent composition according to claim 1, wherein component (A) is a linear organopolysiloxane represented by the said general formula (1) wherein c=0 and d=0, and the percentage of the number of the aryl group-containing organic groups having 6 to 10 carbon atoms in component (A) is 5 to 30%, based on the total number of groups each bonded to a silicon atom, in component (A).

8. The silicone release agent composition according to claim 1, wherein the percentage of the number of the aryl group-containing organic group is 10 to 30%, based on the number of the hydrogen atom each bonded to a silicon atom and the groups each bonded to a silicon atom in component (C-1).

9. A release paper or film comprising a substrate and a layer, on at least one surface of the substrate, composed of a cured product of the silicone release agent composition according to claim 1.

10. A layered substance composed of the release paper or film according to claim 9 and a silicone adhesive layer attached to at least part of the surface of the cured product of the silicone release agent composition.

11. The layered substance according to claim 10, wherein the silicone adhesive layer is a cured product of a silicone adhesive composition comprising the following components (G) and (H):
(G) linear or branched polydiorganosiloxane in an amount of 25 to 80 parts by mass, per total 100 parts by mass of components (G) and (H),
(H) organopolysiloxane comprising an $R^7_3SiO_{1/2}$ unit and an $SiO_{4/2}$ unit and optionally having a hydroxyl group or alkoxy group bonded to a silicon atom, wherein $R^7$ is, independently of each other, a substituted or unsubstituted monovalent hydrocarbon group having 1 to 10 carbon atoms, a molar ratio of ($R^7_3SiO_{1/2}$ unit)/($SiO_{4/2}$ unit) is 0.5 to 1.5, in an amount of 75 to 20 parts by mass, per total 100 parts by mass of components (G) and (H).

12. The layered substance according to claim 11, wherein the silicone adhesive composition is an addition curable silicon composition comprising the following components (G1), (H1), (I) and (J):
(G1) linear or branched polydiorganosiloxane having two or more alkenyl groups in one molecule, in an amount of 25 to 80 parts by mass, per total 100 parts by mass of components (G1) and (H1),
(H1) organopolysiloxane having an $R^7_3SiO_{1/2}$ unit and an $SiO_{4/2}$ unit and optionally having a hydroxyl group or alkoxy group bonded to a silicon atom, wherein $R^7$ is, independently of each other, a substituted or unsubstituted monovalent hydrocarbon group having 1 to 10 carbon atoms, and a molar ratio of ($R^7_3SiO_{1/2}$ unit)/ ($SiO_{4/2}$ unit) is 0.5 to 1.5, in an amount of 75 to 20 parts by mass, per total 100 parts by mass of components (G1) and (H1),
(I) organohydrogenpolysiloxane having three or more SiH groups in one molecule, in such an amount that a ratio of the number of the SiH group in component (I) to the number of the alkenyl group in component (G1) is from 0.5 to 20, and
a catalytic amount of (J) platinum group metal catalyst.

13. The silicone release agent composition according to claim 2, wherein a mass ratio of component (A) to component (B) is 90/10 to 99.5/0.5.

14. The silicone release agent composition according to claim 2, wherein component (B) is represented by the following formula (6):

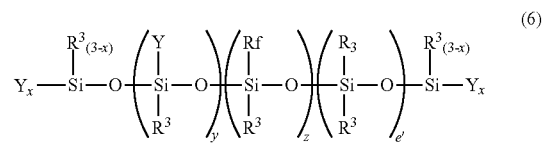

wherein $R^3$ is, independently of each other, a substituted or unsubstituted, monovalent hydrocarbon group having 1 to 10 carbon atoms and no aliphatic unsaturated bond, Y is an alkenyl group-containing organic group having 2 to 10 carbon atoms, Rf is a fluorine-containing organic group, x is an integer of 1 to 3, y is an integer of 0 or more, z is an integer of 1 or more, e' is an integer of 0 or more and y, z and e' satisfy an equation, $50 \leq y+z+e'+2 \leq 5,000$.

15. The silicone release agent composition according to claim 3, wherein component (B) is represented by the following formula (6):

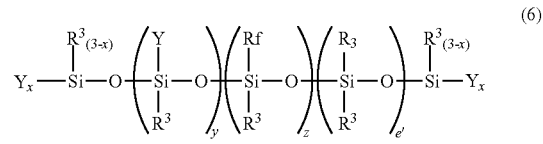

wherein $R^3$ is, independently of each other, a substituted or unsubstituted, monovalent hydrocarbon group having 1 to 10 carbon atoms and no aliphatic unsaturated bond, Y is an alkenyl group-containing organic group having 2 to 10 carbon atoms, Rf is a fluorine-containing organic group, x is an integer of 1 to 3, y is an integer of 0 or more, z is an integer of 1 or more, e' is an integer of 0 or more and y, z and e' satisfy an equation, $50 \leq y+z+e'+2 \leq 5,000$.

16. The silicone release agent composition according to claim 2, wherein the fluorine-containing organic group in component (B) is represented by the following structural formula (3), (4) or (5):

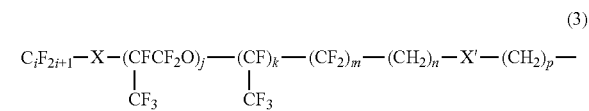

wherein i is an integer of from 0 to 5, j is an integer of from 1 to 10, k is 0 or 1, m is an integer of from 0 to 2, n is an integer of from 0 to 2, p is an integer of from 1 to 5, and X and X' are, independently of each other, an oxygen atom or a single bond;

wherein q is an integer of from 1 to 20, r is an integer of from 0 to 2, s is an integer of from 1 to 6 and X is an oxygen atom or a single bond;

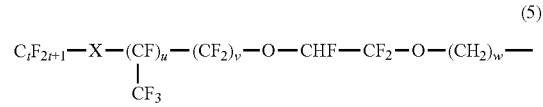

wherein t is an integer of from 1 to 10, u is 0 or 1, v is an integer of from 0 to 3, w is an integer of from 1 to 12, and X is an oxygen atom or a single bond.

17. The silicone release agent composition according to claim 3, wherein the fluorine-containing organic group in component (B) is represented by the following structural formula (3), (4) or (5):

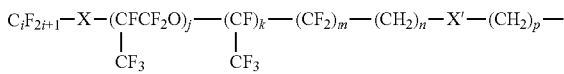  (3)

wherein i is an integer of from 0 to 5, j is an integer of from 1 to 10, k is 0 or 1, m is an integer of from 0 to 2, n is an integer of from 0 to 2, p is an integer of from 1 to 5, and X and X' are, independently of each other, an oxygen atom or a single bond;

  (4)

wherein q is an integer of from 1 to 20, r is an integer of from 0 to 2, s is an integer of from 1 to 6 and X is an oxygen atom or a single bond;

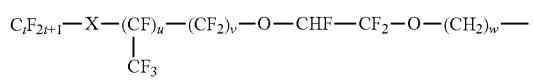  (5)

wherein t is an integer of from 1 to 10, u is 0 or 1, v is an integer of from 0 to 3, w is an integer of from 1 to 12, and X is an oxygen atom or a single bond.

18. The silicone release agent composition according to claim 4, wherein the fluorine-containing organic group in component (B) is represented by the following structural formula (3), (4) or (5):

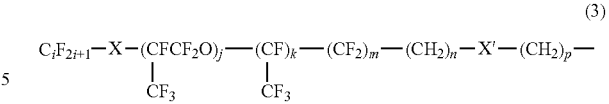  (3)

wherein i is an integer of from 0 to 5, j is an integer of from 1 to 10, k is 0 or 1, m is an integer of from 0 to 2, n is an integer of from 0 to 2, p is an integer of from 1 to 5, and X and X' are, independently of each other, an oxygen atom or a single bond;

  (4)

wherein q is an integer of from 1 to 20, r is an integer of from 0 to 2, s is an integer of from 1 to 6 and X is an oxygen atom or a single bond;

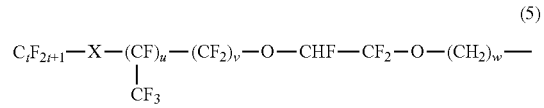  (5)

wherein t is an integer of from 1 to 10, u is 0 or 1, v is an integer of from 0 to 3, w is an integer of from 1 to 12, and X is an oxygen atom or a single bond.

19. The silicone release agent composition according to claim 1, wherein the percentage of the number of the alkenyl group-containing organic group is 0.05 to 4% and a percentage of the number of the fluorine-containing organic group is 7 to 30%, each based on the total number of groups each bonded to a silicon atom, in component (B).

* * * * *